United States Patent
Shimada et al.

(10) Patent No.: US 8,156,055 B2
(45) Date of Patent: Apr. 10, 2012

(54) SYSTEM AND METHOD FOR UTILITY USAGE, MONITORING AND MANAGEMENT

(75) Inventors: Jun Shimada, New York, NY (US); Mei Shibata, New York, NY (US); Philip Eoin MacMenamin, North Bergen, NJ (US)

(73) Assignee: ThinkEco, Inc., New York, NY (US)

( * ) Notice: Subject to any disclaimer, the term of this patent is extended or adjusted under 35 U.S.C. 154(b) by 551 days.

(21) Appl. No.: 12/387,539

(22) Filed: May 4, 2009

(65) Prior Publication Data

US 2010/0280978 A1    Nov. 4, 2010

(51) Int. Cl.
*G06F 15/18* (2006.01)
(52) U.S. Cl. .......................................................... 706/12
(58) Field of Classification Search ...................... 706/12
See application file for complete search history.

(56) References Cited

U.S. PATENT DOCUMENTS

| | | | |
|---|---|---|---|
| 7,209,804 B2 * | 4/2007 | Curt et al. ...................... | 700/286 |
| 7,669,061 B2 * | 2/2010 | Curt et al. ...................... | 713/300 |
| 7,881,907 B2 * | 2/2011 | Curt et al. ...................... | 702/188 |
| 2004/0024475 A1 | 2/2004 | Berkcan et al. | |
| 2009/0195349 A1 | 8/2009 | Frader-Thompson et al. | |

FOREIGN PATENT DOCUMENTS

| | | |
|---|---|---|
| WO | WO02084949 | 10/2002 |
| WO | WO2007092502 | 8/2007 |

OTHER PUBLICATIONS

Written Opinion of the International Searching Authority (PCT/US2010/033170). Nov. 17, 2011.
U.S. Appl. No. 12/284,051.

* cited by examiner

*Primary Examiner* — Michael B Holmes
(74) *Attorney, Agent, or Firm* — Kalow & Springut, LLP; Scott D. Locke, Esq.

(57) ABSTRACT

Systems and methods are provided for collecting waveform data for a plurality of appliances that may be found in a residential or commercial setting using multi-port outlet monitoring devices to obtain power consumption profiles that indicate power consumption on a per-appliance and/or per-location basis and/or per user basis. The plurality of appliances is reliably identified from the power consumption profiles. In accordance with a method embodiment, waveform data transmitted from an unknown appliance is independently metered via a multi-port monitoring device over an elapsed time period. The metered waveform data is wirelessly transmitted from the multi-port monitoring device to a co-located system controller which constructs an appliance signature. The process may be repeated to generate multiple appliance signatures. The one or more appliance signatures are compared to a database of pre-stored canonical signatures to determine if there is a match to identify the appliance.

30 Claims, 15 Drawing Sheets

Appliance signature collection routine

SYSTEM AND METHOD FOR UTILITY USAGE, MONITORING AND MANAGEMENT

BACKGROUND OF THE INVENTION

1. Field of the Invention

The present invention generally relates to methods and systems for utility usage, monitoring and management.

2. Description of the Related Art

With serious concerns regarding global warming on the rise, civic and corporate efforts to improve energy conservation have steadily increased. Major US cities, for example, have independently vowed to reduce their emissions level to 7% below 1990 levels by 2012. New developers, perhaps in response to rising market and civic pressures, have started to adhere to standards set by the US Green Building Council's Leadership in Energy and Environmental Design (LEED) program. Finally, many corporations are initiating green corporate energy marketing campaigns and increasing green product lines wherever possible.

In response to increasing media coverage of global warming, the average consumer's desire to reduce carbon emissions is at an all-time high, with 61% of the population seeing global warming as a real concern. Unfortunately, there are no cost-effective and systematic ways today to convert this desire into a rigorous, measurable conservation effort. On one hand, typical and easy ways for individuals to conserve resources are very hard to quantify (e.g., taking shorter showers). On the other, serious conservation efforts (such as solar energy conversions) are very expensive and require significant lifestyle changes. Furthermore, when consumers do try to conserve, they are unable to see the impact of their collective efforts. This lack of information discourages conservation efforts, and may partly explain why most people rely on corporations and the government to spearhead the majority of green initiatives.

Within this context, what can make a big positive difference to individual conservation efforts is an energy management solution that would allow consumers to easily track their electricity use at the level of each appliance or each socket, so that consumers can pinpoint personal conservation opportunities based on their everyday activities. Granularity of data at the appliance level is critical because people interact with individual appliances, rather than with the whole home or office at any given point in time. This means that the energy management system needs to be flexible to work under all typical residential and commercial usage patterns, e.g. ability to freely interchange appliances for "plug-and-use" with the energy management solution and ability for the system to identify what is being plugged in.

Furthermore, what is needed is a cost-effective and accurate means of aggregating individual usage behavior up to a population level so that consumers can see the cumulative impact of their conservation effort and understand how much more they may be able to save relative to their peers. Again, aggregated data would be most useful if obtained at the level of each appliance, since this would allow for meaningful comparisons across users and populations. For example, "How much energy has a community of users saved in the past month by raising their wall air conditioner temperature setting by 2 degrees F?" or "Which appliances are the most energy efficient under real-world usage patterns?" To enable this, the energy management solution would have to incorporate a systematic and objective way of assessing, validating and learning which type of appliance is responsible for the electricity consumption data collected through each outlet using an outlet monitoring device.

The present invention addresses these concerns.

SUMMARY OF THE INVENTION

It is an object of the invention to provide a system and method for collecting waveform data for a plurality of appliances that may be found in a residential or commercial setting using multi-port outlet monitoring devices (OMDs) to obtain power consumption profiles that indicate power consumption on a per-appliance and/or per-location basis and/or per user basis.

It is a more particular object of the invention to be able to reliably identify the plurality of appliances that are plugged into respective multi-port outlet monitoring devices (OMDs) that may be found in a residential or commercial setting.

As a method of remotely identifying at least one unknown appliance, one embodiment of the invention includes at least the operations of independently metering waveform data transmitted from said at least one unknown appliance via a multi-port monitoring device over an elapsed time period; wirelessly transmitting the independently metered waveform data from the multi-port monitoring device to a co-located system controller; constructing one or more appliance signatures at said co-located system controller for the at least one unknown appliance from the wirelessly transmitted waveform data; and processing the one or more constructed appliance signatures at the system controller to identify the at least one unknown appliance.

As a system for reliably identifying a plurality of appliances that are plugged into respective multi-port outlet monitoring device, one embodiment of the invention includes at least: An identification and detection system for detecting and identifying a plurality of unknown electrical devices, comprising: (I) a local system controller 50 as shown in FIG. 1C, comprising: (i) a data uploading module 52 configured to send appliance signature data from the local system controller 50 to the system management node 102; (ii) a data packaging module 54 operatively coupled to the data uploading module 52 and configured to compress appliance signature data for transmission over a network 60; (iii) a database 56 configured to store a local copy of canonical signatures; (iv) a processor 58 configured to run one or more software modules that perform key algorithmic steps as flowcharted in FIGS. 2-7; (v) a module 67 configured to wirelessly receive independently metered waveform data; (II) a plurality of multi-port monitoring devices 12 configured to independently meter waveform data transmitted from a respective plurality of unknown appliances over an elapsed time period and wirelessly transmit the waveform data to the system controller 50, as shown in FIG. 1B; (III) a system management node 102 as shown in FIG. 1A comprising: (i) a gateway computer 104 configured to buffer the independently metered waveform data received from the plurality of multi-port monitoring devices and perform server load balancing; (ii) a processor 114 configured to provide dedicated access to an archival database 116; (iii) a plurality of distributed computing nodes 112 configured to execute computational instructions pertaining to the management of canonical signatures and general appliance detection related tasks; (iv) a cluster front end 106 configured to load distribute, load balance, as well as generally manage the distributed computing nodes 112; (v) a transient database 110 for storing short- to mid-term data related to appliance detection.

As a computer readable medium including at least computer program code for enabling a consumer to intelligently manage the consumption of energy by multiple users and/or multiple loads within a residential or commercial setting, one embodiment of the invention includes at least computer program code for: independently metering waveform data from said at least one unknown appliance via a multi-port monitoring device over an elapsed time period; wirelessly transmitting the independently metered waveform data from the multi-port monitoring device to a co-located system controller; constructing one or more appliance signatures at said co-located system controller for the at least one unknown appliance from the wirelessly transmitted waveform data; and processing the one or more constructed appliance signatures at the system controller to identify the at least one unknown appliance.

BRIEF DESCRIPTION OF THE DRAWINGS

These and other objects, features and advantages of the invention are apparent from a consideration of the following Detailed Description Of The Invention considered in conjunction with the drawing Figures, in which.

DETAILED DESCRIPTION OF THE INVENTION

Figure 1A:
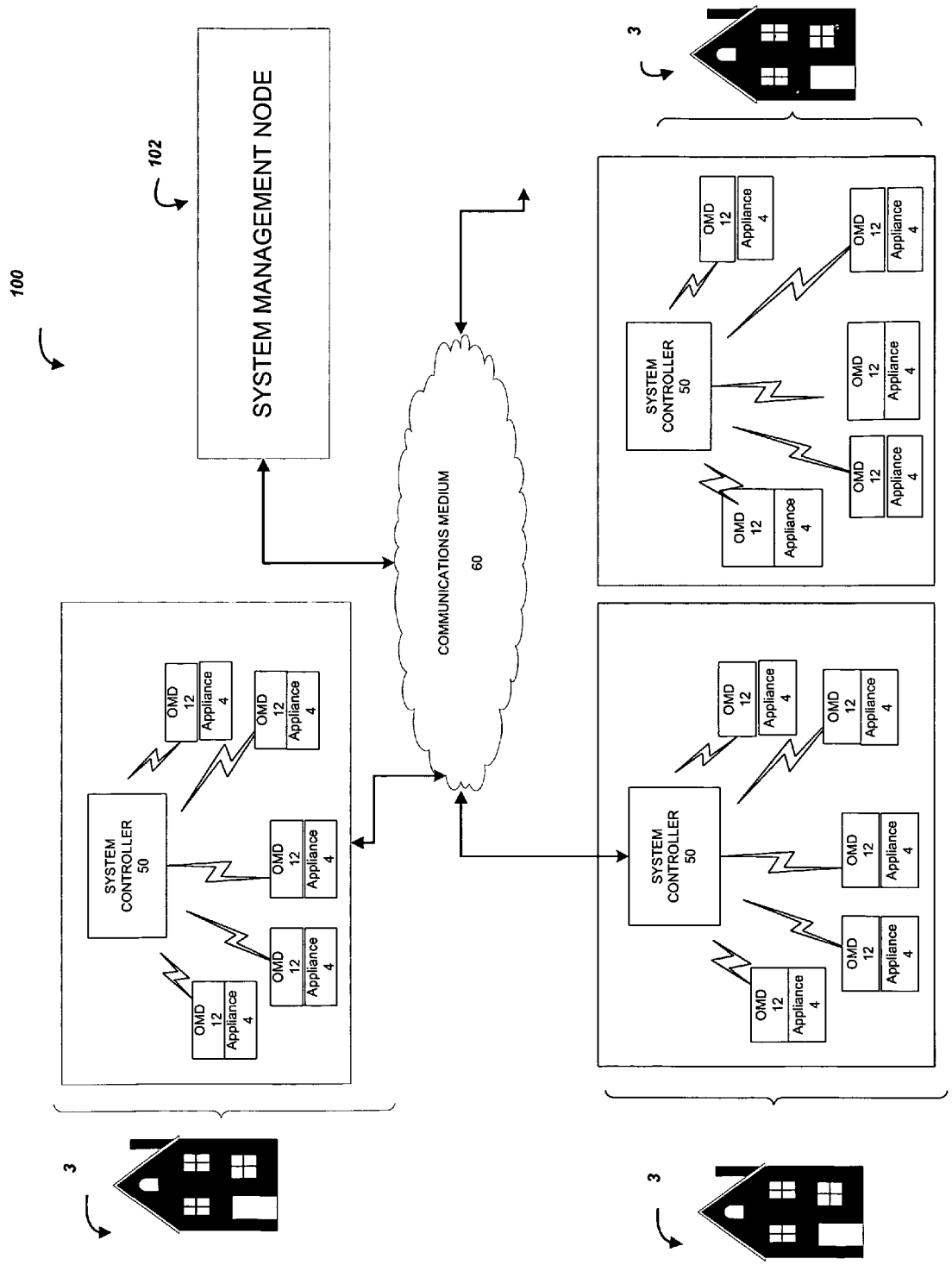
FIG. 1A is a block diagram illustrating an architecture of a system 100 for appliance detection and identification, in accordance with one embodiment of the invention.

In the following discussion, numerous specific details are set forth to provide a thorough understanding of the present invention. But those skilled in the art will appreciate that the present invention may be practiced without such specific details. In other instances, well-known elements have been illustrated in schematic or block diagram form in order not to obscure the present invention in unnecessary detail. Details concerning network communications, electromagnetic signaling techniques and the like have been omitted inasmuch as such details are not considered necessary to obtain a complete understanding of the present invention. Such details are considered to be within the understanding of persons of ordinary skill in the relevant art.

The present description illustrates the principles of the present disclosure. It will thus be appreciated that those skilled in the art are able to devise various arrangements that, although not explicitly described or shown herein, embody the principles of the disclosure and are included within its spirit and scope.

All examples and conditional language recited herein are intended for pedagogical purposes so that the reader can understand the principles of the disclosure and the concepts contributed by the inventor to furthering the art. These examples are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It is appreciated that a variety of programming languages may be used to implement the teachings of the inventions as described herein.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); and a hard disk.

DEFINITIONS

The term "appliance" as used herein refers to any device that may be electrically coupled to a wall socket.

The terms "multiplexing" or "muxing" and "mux" as used herein refers to the generation of a single, combined data stream from two or more input streams of data.

The term "de-muxing" as used herein refers to the inverse process of muxing, where one recovers the original signals that have been multiplexed.

The term "waveform data" as used herein refers to current and/or voltage as a function of time. It may also refer to the power as a function of time.

The term "short-time" waveform refers to appliance waveform data collected over a period on the order of a few seconds or less. On the other hand, the term "long-time" waveform refers to appliance waveform data collected over a period at least ten seconds long.

The term "modes of operation" refers to the different operating modes of an appliance.

The term "path" refers to the series of modes of operation consecutively visited by an appliance during a single use.

The term "transition" refers to appliance waveform data that is collected between two consecutive modes of operation.

The term "Canonical signature of an appliance" is an accurate summary representation of all the signatures that may be collected for a particular appliance and refers to the modes, path, and transitions, and associated waveform properties of such modes and transitions. The Canonical signature also includes so-called, "non-electrical" data, such as geophysical and demographic data. In its most general form, a canonical signature S is a set of properties $P_i$, such as modes and transition matrices, that are characteristic of that appliance: $S=\{P_1, P_2, \ldots P_n\}$.

The term "waveform property" refers to a numerical and/or descriptive characteristic of time-dependent waveform. Examples of such properties for a given waveform are: its absolute maximum and minimum values, the number of local extrema, its derivative or integral, or its power spectrum.

Index

The following disclosure is generally divided into the following sections:
  I. Introduction
  II. System Diagram
  III. Exemplary Residential Embodiment
  IV. Appliance Signatures
    1. Basic components of an appliance signature
    2. Electronic signature components
    3. Electronic signature component construction
    4. Non-electrical signature component construction
    5. Complete appliance signature construction
  V. Canonical Signatures
    1. Basic components of a canonical signature
    2. Canonical signature construction
  VI. Canonical Signature database (CSD)
    1. Data organization of the Canonical Signature Database
    2. Classification based on unsupervised learning methods
    3. Data quality of the Canonical Signature Database
  VII. Signature Matching
    1. Scoring based on classification algorithms
    2. Training classifiers to reduce false positives
  VIII. Privacy Issues
  IX. Flowchart of a Method Embodiment Section I. Introduction According to embodiments of the invention, an appliance detection and identification system and associated methods are provided for reliably identifying a plurality of appliances that are plugged into respective multi-port outlet monitoring devices (ONMDs) that may be found in a residential or commercial setting.

Advantages of the system of the invention include, for example, providing users with the ability to reliably identify appliances (i.e., dishwashers, toasters, TVs) plugged into respective multi-port outlet monitoring (OMD) devices and freely interchange appliances for "plug-and-use" in the multi-port OMD devices.

The appliance detection system of the invention provides numerous advantages over prior art systems and may be characterized according to five key non-limiting characteristics. First, the system of the invention allows a plurality of outlet monitoring devices (OMDs) to fade into the customer's background behavior. In other words, the system allows the OMDs to seamlessly blend into the customer's daily routine and minimize the behavioral change required for using the OMDs. Second, the system of the invention has an extremely high reliability threshold both in terms of operational use and appliance identification accuracy. Third, the system is capable of operating in real-time or near real-time to provide immediate user feedback. Fourth, the system takes into account privacy concerns of the user. Fifth, users are able to independently control the operation of their respective local system controllers as desired, e.g. turn it on/off. It should be appreciated that these five characteristics are merely exemplary and not provided by way of limitation. Other characteristics are apparent upon reading the present disclosure.

The afore-mentioned characteristics place the following associated requirements on the system. These requirements are fulfilled by the system of the invention and include, first and foremost, flexibility, whereby the system is required to be able to operate with a diverse array of data, which are representative of the many ways in which an appliance can be used by different users. Accuracy, whereby the system is designed and optimized in such a way as to reduce false identifications (i.e., false positives). Speed, whereby the system is required to be able to rapidly identify a particular appliance from among a space of approximately $10^4$-$10^5$ branded appliances. Privacy, whereby personalized OMD data is not communicated outside of the user's personalized system controller, which is co-located in the user's residence. Data efficiency, whereby the system provides capabilities for storing the measured waveform data locally in the OMD devices in the case where the system controller is in an "off" state.

Section II. System Diagram

FIG. 1A is a block diagram illustrating an architecture of a system 100 for appliance detection and identification, in accordance with one embodiment of the invention. The system 100 in one embodiment includes a system management node 102. The system management node 102 performs innumerable functions related to the collection, organization and dissemination of power consumption profiles that indicate power consumption on a per-appliance and/or per-location basis and/or per user basis and to the reliable identification of a plurality of appliances that are the source of the power consumption profiles. Communications medium 60 connects the system management node 102 and client nodes 3 (three are shown for ease of explanation), which are remote from the system management node 102. Communications medium 60 may be embodied as the Internet, Extranet, packet-switched network, Virtual Private Network, using various packet-switching technologies such as Internet Protocol (IP), frame relay, asynchronous transfer mode (ATM), among others. Client nodes 3 may also communicate over a wireless network, e.g., a cellular or satellite communications network.

Figure 1B:
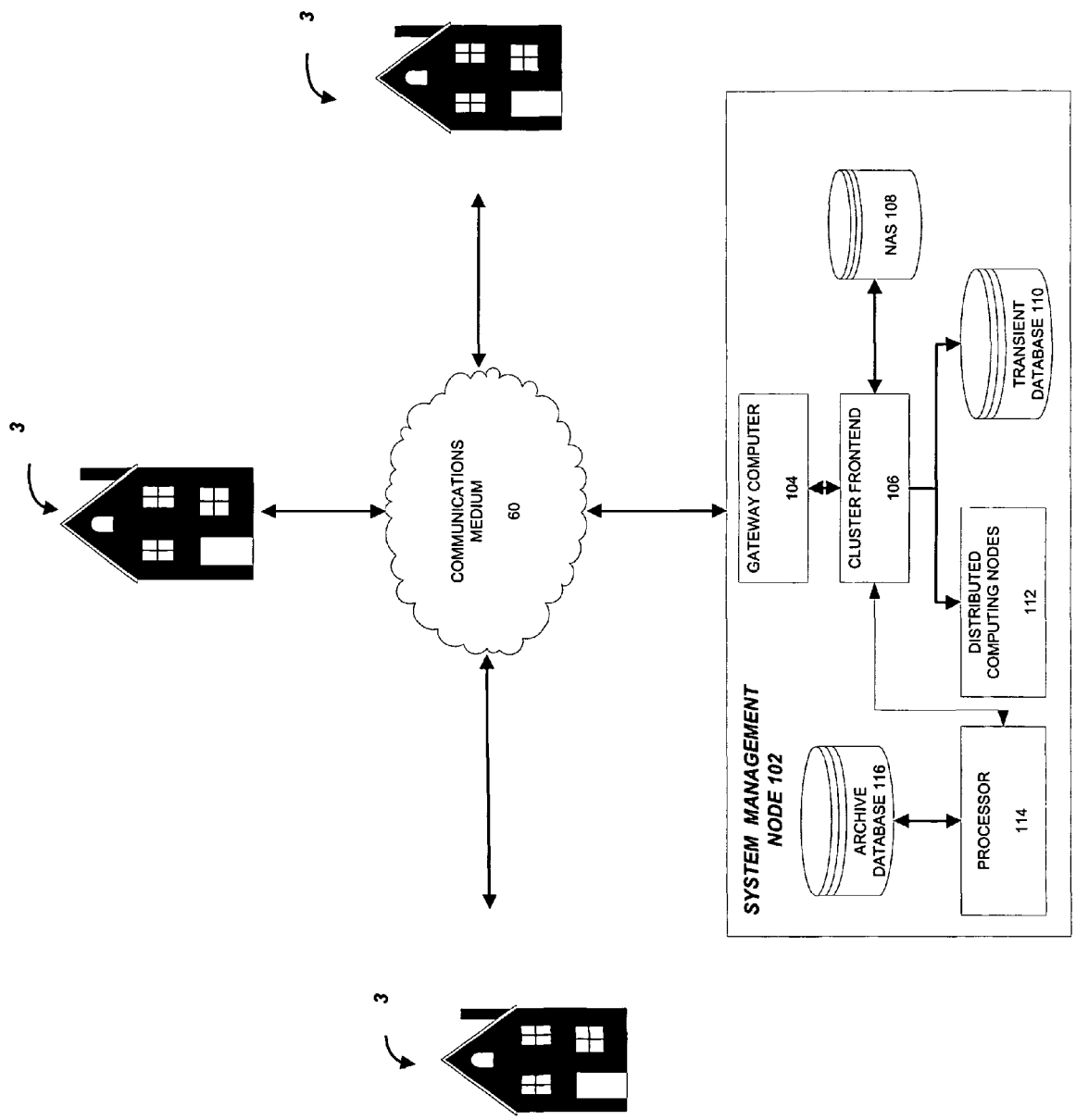
FIG. 1B is a more detailed illustration of the system management node 102 of FIG. 1A, in accordance with one embodiment of the invention.

With reference now to FIG. 1B, system management node 102 is shown to include a set of infrastructure components. Each component or subsystem of the system 100 may be in operable communication with other components of the system 100, as necessary, for example, through the use of remote method invocation ("RMI") or other component messaging services in the case of software, or bus interconnects in the case of hardware.

In an exemplary embodiment, system management node 102 includes a gateway computer 104, a computational cluster frontend 106, distributed computing nodes 112, a network available storage (NAS) device 108, a transient database 110 that stores processed canonical signature-related data as they are collected from client nodes, and a processor 114 that dedicatedly manages an archival database 116 that robustly stores canonical signatures. The gateway computer 104 acts as a portal to allow the plurality of distributed system controllers 50 (See FIG. 1A) associated with the respective client nodes 3 to communicate with the system management node 102 via the communications medium 60. The gateway computer 104 provides standard well-known Internet services, such as a firewall and data flow buffering, and is preferably configured to ensure that the other elements of the system management node 102 remain isolated and secure from the communications medium 60 for security purposes. The gateway computer 104 receives data/instructions from the distributed system controllers 50, sometimes referred to herein as residential client computers 50. The data/instructions received from the distributed system controllers 50 may include, for example, usage pattern data, energy use data on various appliances and requests to retrieve canonical appliance signatures. One function performed by Gateway computer 104 is to confirm that the data/instructions received from the distributed system controllers 50 has not been corrupted or poses a security threat. In one embodiment, the gateway computer 104 forwards the data/instructions received from the various distributed system controllers 50 to a computational cluster frontend 106, which is a processor configured to perform various processing tasks including, but not limited to, (1) dispatching instructions to a plurality of distributed computing nodes 112, (2) reading from and writing to databases 110, 116, and (3) accessing data on the network available storage device (NAS) 108.

In addition to the functions described above, the cluster front end 106 may also receive requests for human, or machine, readable reports from the plurality of distributed system controllers 50 via gateway computer 104. Examples of human-readable reports that may be requested by a client node 3 include a request to see how much electricity a group of appliances has used during a particular time period. One or more software modules resident at system management node 102 are operable provide as output, updates regarding how much energy a particular group of appliances has used at a particular client node 3. An example of a machine-readable report that may be requested by a client node 3 includes a request to receive the canonical signature for a particular appliance. Canonical signatures are defined further below. Upon receiving a request for a report (e.g., human or machine readable), the gateway computer 104 examines the request and first confirms it is not a security threat, privacy violation, or other malicious request. In the case that the request for a report is not a security threat, privacy violation or other malicious request, it then passes on the request to the front end cluster 106 that can read from database 110 and/or database 116. The front end cluster 106, in some cases, executes the request and in other cases dispatches the request to the distributed computing nodes 112 for execution. Front end cluster 106 then returns the information provided in response to the request to gateway computer 104. Upon receiving the returned information at gateway computer 104, it formulates the data into the appropriate human- or machine-readable format, and communicates it back to the requesting client node 3 via the communications medium 60.

In one embodiment, since the gateway computer 104 also interfaces with the computational cluster frontend 106, if necessary, it will also perform load balancing using an algorithm such as, for example, Round Robin or Ibnamed. Other load balancing algorithms not explicitly recited herein are also within contemplation of the invention. The gateway computer 104 watches network traffic distribution to monitor the availability of the cluster frontend 108. In one embodiment, the gateway computer 104 may be embodied as a Dual Quad core Intel Xeon chip, with a redundant power supply, 15,000 RPM hotswap SATA RAID1 with a large memory.

The computational cluster front end 106 is used in one way to execute any large scale computational tasks received from either the gateway computer 104 or the archive database manager processor 114. In some embodiments, non-cluster machines (not shown) can interact only with the cluster front end 106. Non-limiting examples of these large scale tasks are OMD data management, such as sorting user records, and the creation of a canonical appliance signature classification tree, to be described further below. A primary, but not exclusive function of the cluster front end 106 is to dispatch the large computational tasks it receives to the distributed computing nodes 112 and perform load balancing.

NAS device 108 is configured to provide fast, shared disk space between the distributed computing nodes 112. Transient database 110, in one embodiment, can be implemented as a relational database with binary tree indexing that provides short- to mid-term archiving of data as the data are processed by the distributed computing nodes 112.

A preferred operating system for the cluster front end 106 is the Standard ROCKS cluster, with typical hardware for the cluster front end 106 and distributed computing nodes 112 being rack mounted machines based on Dual Quad Intel Xeon chips. In one embodiment, a high-speed Myrinet connection is used between the distributed computing nodes 112 to optimize communication speeds. In one embodiment, the cluster front end 106 uses a Sun Grid Engine for load distribution/balancing. The NAS device requires a minimum capacity of 5 TB with Gigabit Ethernet cards. Database 110 can be embodied as a MySQL cluster database implemented using multiple 1U twin Dual Quad Intel Xeon machines.

The archival database 116 is where the Canonical Signature Database (CSD) will reside. Because this CSD forms the backbone of the appliance detection system, the archival database 116 must be secure, highly reliable, and always available. As a result, the managing processor 114 should be a dedicated, highly redundant machine. A typical configuration for this archival database 116 can be, for example, a relational Oracle or MySQL database with binary tree indexing.

Figure 1C:
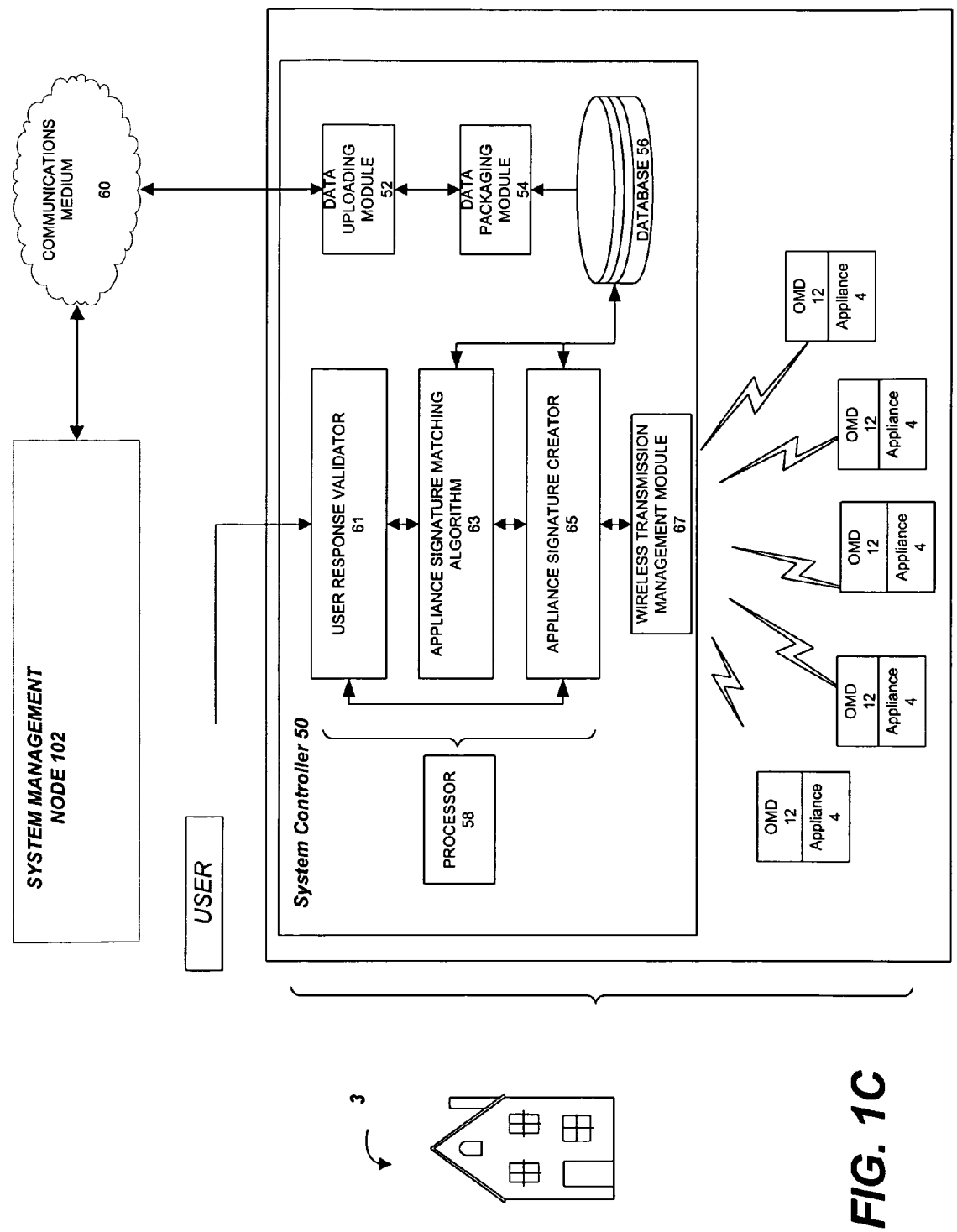
FIG. 1C is a more detailed illustration of a client node 3, in accordance with one embodiment of the invention.

With reference now to FIG. 1C, a typical client node, i.e., client node 3, is shown to include, according to an exemplary embodiment, a set of infrastructure components. Each component or subsystem of client node 3 may be in operable communication with other components of client node 3, as necessary, for example, through the use of wireless communication protocols, remote method invocation ("RMI") or other component messaging services in the case of software, or bus interconnects in the case of hardware.

In an exemplary embodiment, client node 3 includes a system controller 50 and a plurality of outlet monitoring devices (OMDs) 12 in communication with the system controller 50. The system controller 50 is sometimes referred to herein as a residential client computer. Each outlet monitoring device (OMD) 12 is coupled to a particular household appliance at the client node 3. The process of coupling OMD's 12 to appliances to collect data therefrom is discussed in greater detail in co-pending application Ser. No. 12/284,051, incorporated by reference herein in its entirety.

System controller 50 communicates with the management entity node 102 via the communication medium 60. The plurality of OMDs 12 wirelessly communicates with the system controller 50.

With reference to FIGS. 1A-1C, an overview of a process for remotely detecting and identifying appliances to determine their power consumption profiles is now described. A more detailed description is provided further below in accordance with an exemplary residential embodiment.

As shown in FIGS. 1A and 1C, the plurality of OMDs 12 at each client node 3 wirelessly communicates their respective electrical and non-electrical coupled appliance information to a respective co-located system controller 50. For example, for a particular appliance (e.g., dishwasher, TV, etc.) located at a particular client node 3, an OMD 12 electrically coupled to the particular appliance detects and records the electrical and non-electrical information generated by the particular appliance over some time period and wirelessly communicates this information to the system controller 50. The system controller 50 collects and analyzes the data collected by and transmitted from the OMD 12 coupled to the particular appliance. The system controller 50 creates an appliance signature from the data. This process is continuous whereby additional data is collected over time and processed by the system controller 50 to create additional appliance signatures for the particular appliance. Using the one or more appliance signatures created by the system controller 50, an attempt is made at some point to identify the particular appliance. The process of identifying an appliance from one or more created appliance signatures generally comprises matching the one or more created appliance signatures created at the system controller 50 against a local database 56 (see FIG. 1C) of canonical signatures. It should be appreciated that the database 56 of canonical signatures located in system controller 50, is a scaled down copy of a larger archival Canonical Signature Database 116 that is securely and redundantly maintained at the system management node 102. This scaled down copy will feature only those appliances that have a reasonable likelihood of being used by this user, given his demographic profile, past and current appliance ownership history, and daily appliance use history, among other properties. This will allow for the appliance detection system to operate at much faster speeds on the system controller 50, as we anticipate the Canonical Signature Database 116 to grow with time as the OMD system encounters hitherto unknown appliances. The larger archival Canonical Signature Database 116 associated with the system management node 102 (see FIG. 1B) contains generalizations of appliance signatures that have been collected by system management node 102 from many client nodes 3 over time.

Section III. Exemplary Residential Embodiment

With reference again to FIG. 1C, details of the system controller 50 are shown to illustrate an exemplary embodiment of the invention. As described herein and illustrated in the attendant figures, the appliance detection and identification system 100 utilizes a system controller 50 situated inside a client node 3 that can be, in one embodiment, a typical residence setting, including, without limitation, a single family residence or a multiple family residence, such as an apartment building. However, it should be understood that the invention has much broader applicability. In particular, it should be understood by those skilled in the art and guided by the teachings provided herein that the appliance detection and identification system 100 may be used in other suitable settings, including, for example, commercial, industrial and utility applications. Other suitable settings are apparent to the reader.

With continued reference to FIG. 1C, system controller 50 includes a conventional computer processor 58 running operating software described herein which provides the necessary functionality of the operations described herein. It is understood that processor 58 includes other typical components readily known to the reader, for example operating system software (e.g., Intel-based operating system, Unix-based operating system), user interfaces, etc. One of the provided interfaces included with processor 58 is for communicating with the plurality of outlet monitoring devices (OMDs), via wireless links, wired links or combinations thereof. The OMDs 12 are communicably coupled to various electrical outlets found within the residence 3. The outlets found within a residence are generally installed in a per-room and/or per-floor basis.

Appliances 4 in each residence 3 are electrically coupled to the various outlet monitoring devices (OMDs 12). The OMDs 12 are configured to transmit metering data associated with the electrically coupled appliances 4 to the system controller 50, either periodically or on demand.

The plurality of OMDs 12 transmits at least one characteristic of the electrically coupled appliances' 4 electrical consumption, such as current, voltage, or power waveform data to an interface of the system controller 50, i.e., the wireless transmission management module (WTMM) interface 67. The WTMM interface 67 is capable of receiving time-stamped secure packet messages from each OMD 12. The WTMM interface 67 queues the data packet transmissions in a FIFO fashion from the respective OMDs 12.

In one embodiment, the OMDs 12 communicate with system controller 50 via wireless links using a low-power wireless communications protocol such as the ZigBee protocol or the like. ZigBee is built on an Institute of Electrical and Electronics Engineers (IEEE) global standard, 802.15.4, similar to the standards that govern Bluetooth and Wi-Fi.

The OMDs 12 associated with each residence 3 includes hardware circuitry and software components required for communicating via ZigBee or another wireless protocol with system controller 50. In one embodiment, communications are initiated by a ZigBee module included as a component of each OMD 12, which will then be transmitted via a USB or serial port to a system controller 50, or otherwise cache the information in the case where the system controller 50 is in an OFF state. The WTMM interface 67 on the system controller 50 will receive the information, and communicate it to an application running on the client.

In one embodiment, current and voltage waveform data are transmitted from the OMDs 12 with a 16-bit resolution and sampled at a rate of 1 kHz at each outlet. In such an embodiment, the data rate from a given OMD 12 (for a single outlet configuration) can therefore be computed as 32 kbits/sec (1 kHz*16 bits per data sample*2 waveforms). For a two outlet configuration, the required data transmission speed from an OMD 12 is 64 kbit/s, which is well within ZigBee's 250 kbit/s capacity in the 2.4 GHz band.

In at least one embodiment, system controller 50 is configured to receive data pertaining to at least one characteristic of the electrical energy consumed by appliances 4 distributed throughout the residential setting 2 as monitored by the plurality of OMDs 12 of the system.

System controller 50 includes software configured to save, organize and analyze the metering data transmitted from one or more OMDs 12 in one embodiment. Each OMD 12 is assigned a unique address to allow system controller 50 to determine which OMD 12 is interacting with system controller 50. Additionally, using the address, system controller 50 can transmit communication signals to selected OMDs 12 as needed. For example, a single OMD 12 may be selected by system controller 50 to turn "on" or "off" any appliances 4 connected to either or both sockets of the OMD 12. An OMD 12 may also be selected by the system controller 50 to request a transmission from the selected OMD 12.

Organization of the metering data comprises the system controller 50 individually metering and logging consumption of energy, for example, by each appliance 4, of multiple appliances or by each user of multiple users. Other methods of summarizing energy consumption data are within contemplation of the invention as are apparent to the reader. For example, users may choose to summarize by location (e.g. living room) or by one or more device characteristics (e.g. rechargeable devices). System controller 50 is configured to access the metering data and log the metering data to generate a summary of the metering data for energy consumption by each load and/or each user. Using the summary of the metering data, a cost for energy consumption for each user and/or each load can be calculated and the usage and/or consumption of energy by multiple users and/or multiple loads can be better managed.

The system controller 50 obtains metering data by processing the collected waveform data from the OMD devices 12 using proprietary signal processing algorithms. In each data collection session, OMD data is collected from the OMD devices 12 and organized at the system controller 50 in a novel data format referred to herein as an appliance signature, described below in greater detail. The appliance signature compactly captures all noteworthy features of the electronic (voltage/current/power waveform) and non-electronic (time/location/demographic) data collected from the OMDs 12. The theoretical framework underlying an appliance signature is flexible enough to handle the diverse array of appliance uses.

Because the waveform data is transmitted wirelessly, there is an inevitable fundamental loss of data resolution. However, the granularity of the sampled waveform can be improved as future technological advances increase waveform sampling circuitry clock speed, memory size, and transmission bandwidth of the OMD.

When a statistically significant number of appliance signatures are collected for a particular appliance 4, they are combined to create a canonical signature. This process is initially performed in the system controller 50. A canonical signature is an accurate summary representation of all the signatures that may be collected for a particular appliance 4. Each appliance 4 is thus associated with a particular canonical signature. These canonical signatures, along with the identity of the appliance 4 they represent, are securely and redundantly stored in an archival database 116 located in the system management node 102, described further below.

An appliance 4 plugged into an OMD 12 is identified at the system controller 50 by comparing its appliance signatures against a Canonical Signature Database stored in the archival database 116 for the purpose of identifying the appliance 4. In a preferred embodiment, to minimize the search time associated with this signature matching procedure, a tree-based classification system is used to organize the canonical signatures. Such a tree-based classification system provides search time efficiencies as a result of similar appliance types having similar canonical signatures. Further, the algorithms underlying signature matching are based on well established machine learning techniques such as hierarchical clustering and support vector machines. These algorithms provide theoretical methods for determining the confidence levels associated with signature matching predictions. Thus, the number of false positives can be controlled by choosing a higher confidence level threshold when matching signatures.

To maximize the fundamental system accuracy in identifying appliances, sources of errors are carefully addressed before canonical signatures are constructed. In an embodiment, data input from untrustworthy customers are not used for canonical signature construction. Likewise, the initial phase of constructing the canonical signature database only uses signatures that from trustworthy customers.

The signature matching procedure strictly maintains user privacy during normal system operation by not requiring the collected OMD data to be uploaded from the system controller 50. If the customer consents, then all signatures collected through his or her OMD devices, are sent to the system management node 102 to help expand and improve the Canonical Signature Database 116.

Section IV. Appliance Signatures

As is well known in the electrical arts, the internal circuitry details for most appliances are considered proprietary and unavailable. As such, appliances that are plugged into an OMD must be treated as black boxes. The appliance-specific electrical data that can be collected by an OMD 12 are the current and voltage drawn by the appliance as a function of time. With reference to FIGS. 8-11, there is shown the current and voltage draws of 5 typical household appliances. It is shown that each appliance has a very distinct current/voltage draw profile. It is noted, however, that because appliances have fixed circuitry and are designed to have predictable behavior in response to user interaction, each profile shows current and voltage draws that have predictable (regular) characteristics.

Furthermore, for those appliance categories which include products that can be distinguished from different manufacturers, the respective products will exhibit distinct current/voltage draw profiles. For example, in the computer laptop category, laptops made by 2 manufacturers may exhibit distinguishable current/voltage draw profiles, especially if their battery charging algorithms differ. As a contrasting example, a simple 60 W desk lamp made by different manufacturer should exhibit substantially similar current/voltage draw profiles. This is illustrated, for example in FIGS. 8 and 11.

Based on this rationale, it is assumed that if a class of appliance is sufficiently distinct to a user, the appliances in that class should be uniquely identifiable via their respective current/voltage draw profiles. Since the current/voltage draws of an appliance are expected to have reproducible characteristics, we will refer to them as appliance waveforms. These waveforms can be collected over different time scales, which yield different types of information. Short-time waveforms advantageously provide electronic signals characteristic of common circuit design components (e.g., transformers, power supplies). As is well-known, the short-time waveform data can be used as a tool in distinguishing appliances at a very generic level. For example, many switched power supplies, which are widely used to convert high-voltage residential electricity supplies to levels suitable for household electronics, may be characterized by a common non-linear waveform shape. As a further example, appliances that include at least one motor may be characterized by a common phase shifted sinusoidal AC waveform. Accordingly, appliances that utilize a switched power supply are distinguishable, by virtue of their short-time waveform data characteristics, from those that utilize motors. In a practical application, differentiating between switch-power supply appliances based solely on short-time waveform data alone is difficult. One reason is that all appliances that have similar Thevenin equivalent RC time constants will have similar short-time waveforms.

To overcome the limitations imposed of only using "short-time" waveforms, it is contemplated, in accordance with one embodiment, to also collect "long-time" waveforms. In contrast to "short-time" waveforms, these long-time waveforms are collected over many seconds. The long-time waveform data tracks electrical data on the same time scale as the appliance is being used for its real-life application. It is expected, therefore, that the long-time waveform data will accurately reflect the different users and ways of using an appliance. Since we expect two appliances whose end-user characteristics are distinguishable to the consumer to draw electrical power differently, there should be distinguishing characteristics in the long-term waveform data. Note that this is true insofar as appliances are different in how they are used. For example, non-electrical differences, such as name, color or shape, obviously cannot be reflected in any waveform data.

For the exemplary appliances shown in FIGS. 8-11, data collected at one second time resolution is clearly sufficient for identification. Furthermore, we note that as appliances are used over a period of time extending beyond many seconds, the measured waveforms start to acquire distinguishing characteristics that uniquely reflect how the corresponding appliances are being used.

It should be understood that key variations in waveforms that are useful in assisting the process of predicting an appliance's identification, needs to be separated from random variations that simply add noise. Some typical noise sources are, for example, "intrinsic noise" which arises out of effects (e.g., electrical/thermal noise and residential socket AC frequency variations) that are independent of an OMD-based measurement. Other typical noise sources are "extrinsic" which arise directly as a result of an OMD-based measurement procedure. Intrinsic noise is more likely to occur at frequencies different from waveform variations considered relevant for purposes of making appliance identification predictions. As such, the intrinsic noise may be filtered out using conventional waveform processing procedures. Further, other types of intrinsic noise, such as, for example, residential AC line variations are eliminated as the waveform data is statistically averaged over a number of measurements.

The elimination of noise from extrinsic sources is not as easily accomplished. With continued reference to the waveforms of FIGS. 8-11, it can be shown that the current/voltage waveforms can have very different shapes depending on how the appliance is used. These usage differences result in noticeable variations in the waveform, for example, in the length, order, and number of peaks and valleys. These variations are major sources of extrinsic noise in our measurements, and their origin is human in nature. It is expected that this "human" noise is broadly "individualistic" as the people using the appliances themselves. Presently, there are no known methods for eliminating this type of extrinsic noise. In accordance with a method embodiment of the disclosure, the construction of appliance signatures from an appliance waveform is a novel method that is disclosed for at least controlling this type of noise.

Figure 8:
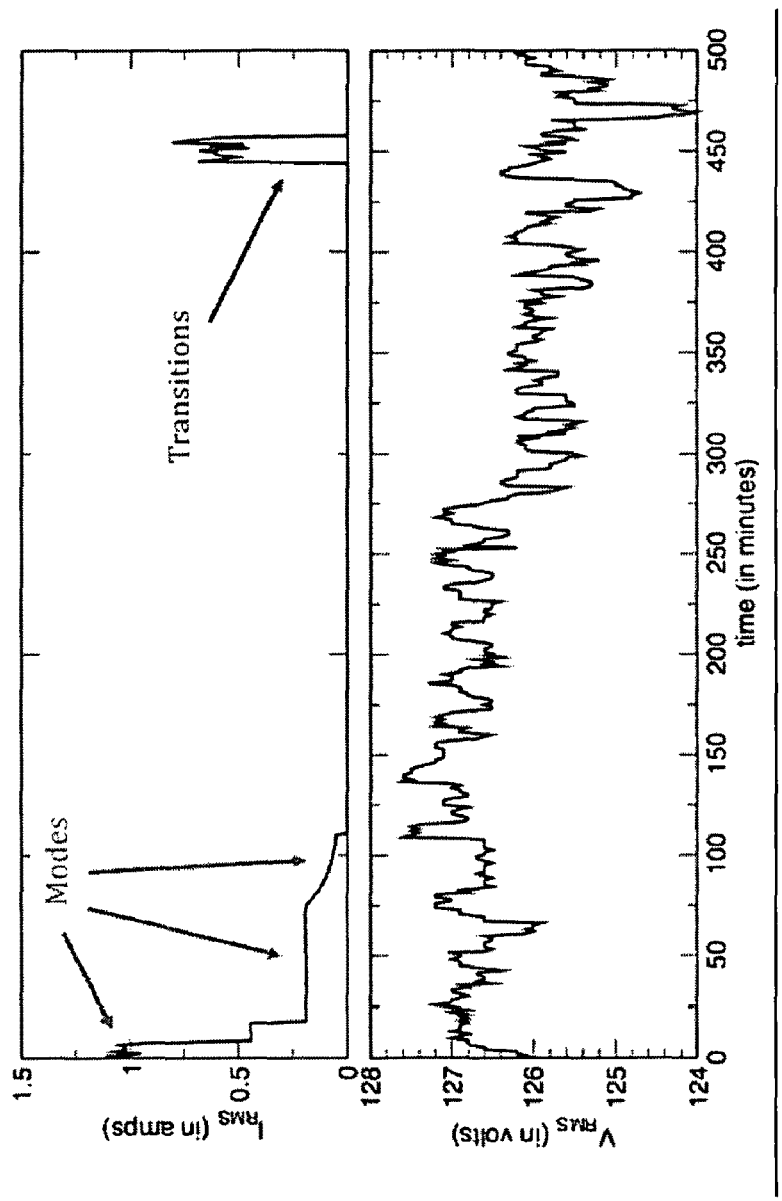
FIGS. 8-11 illustrate the current and voltage draws of 5 typical household appliances.
Figure 9:
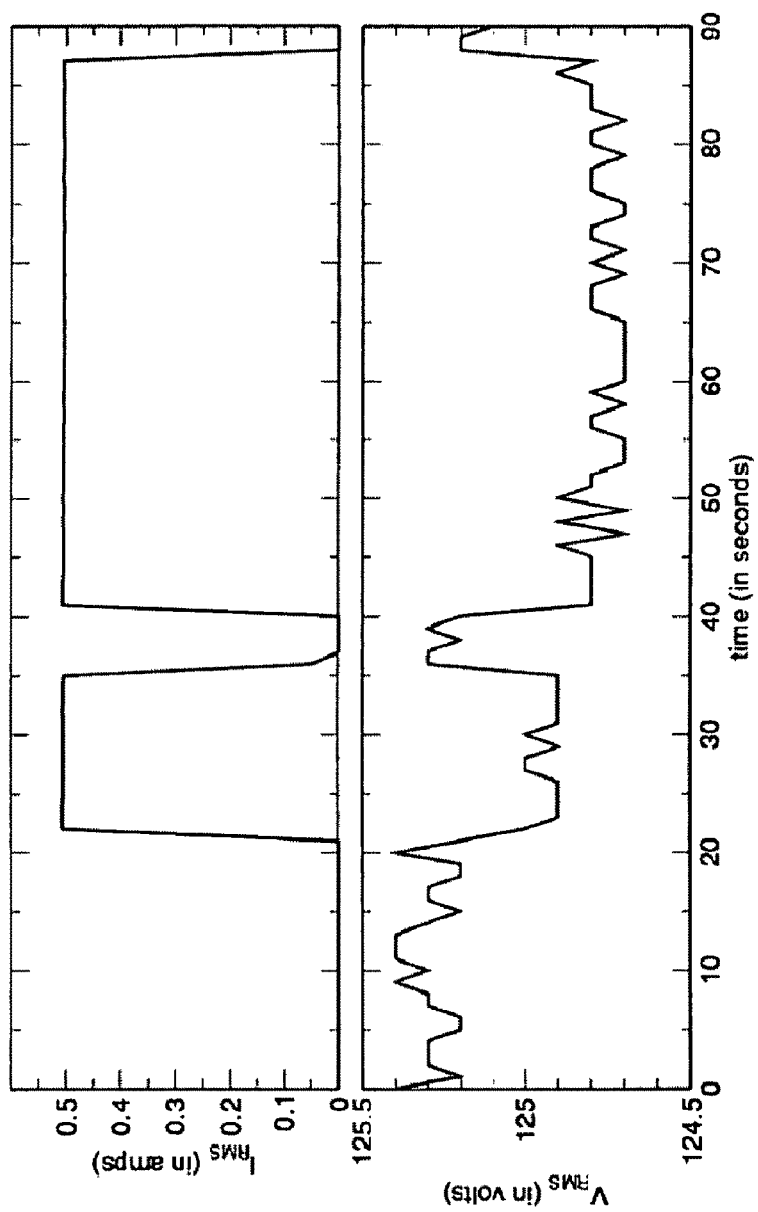
Figure 10:
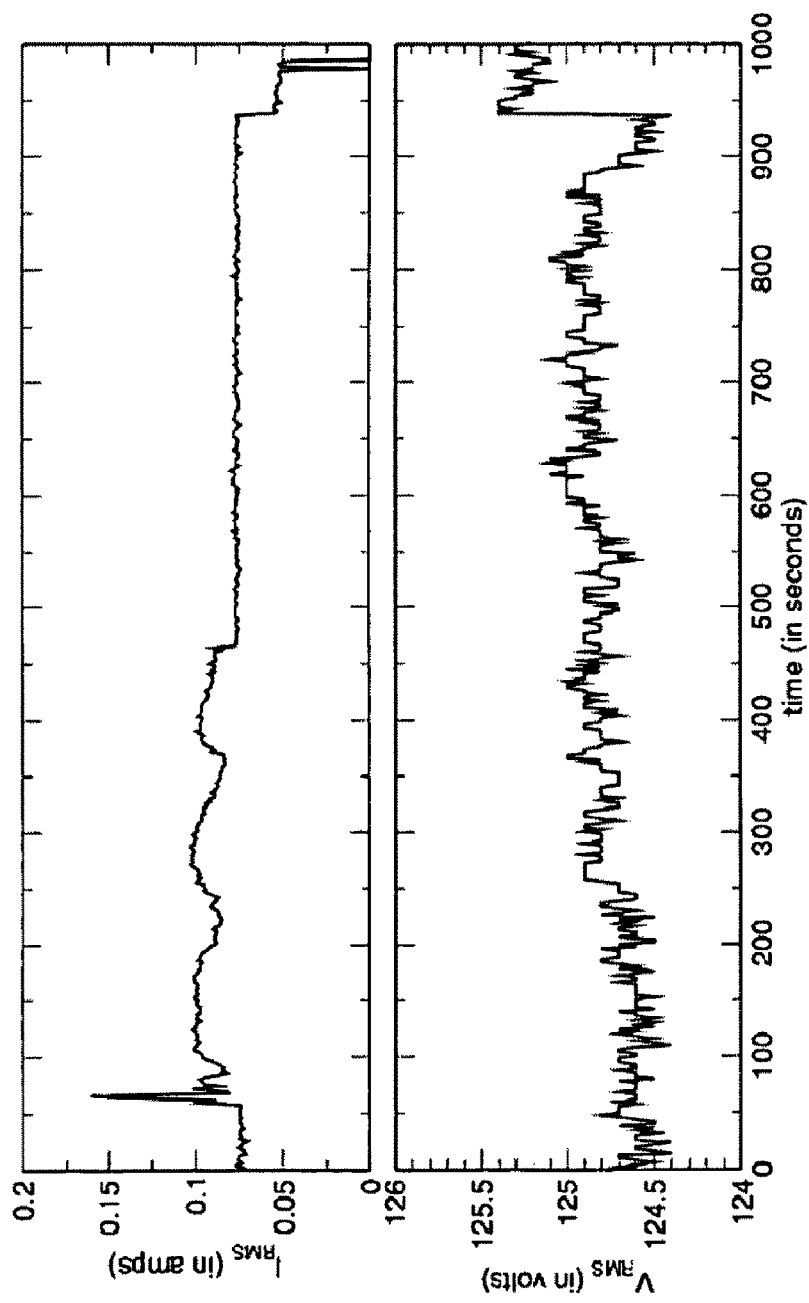
Figure 11:
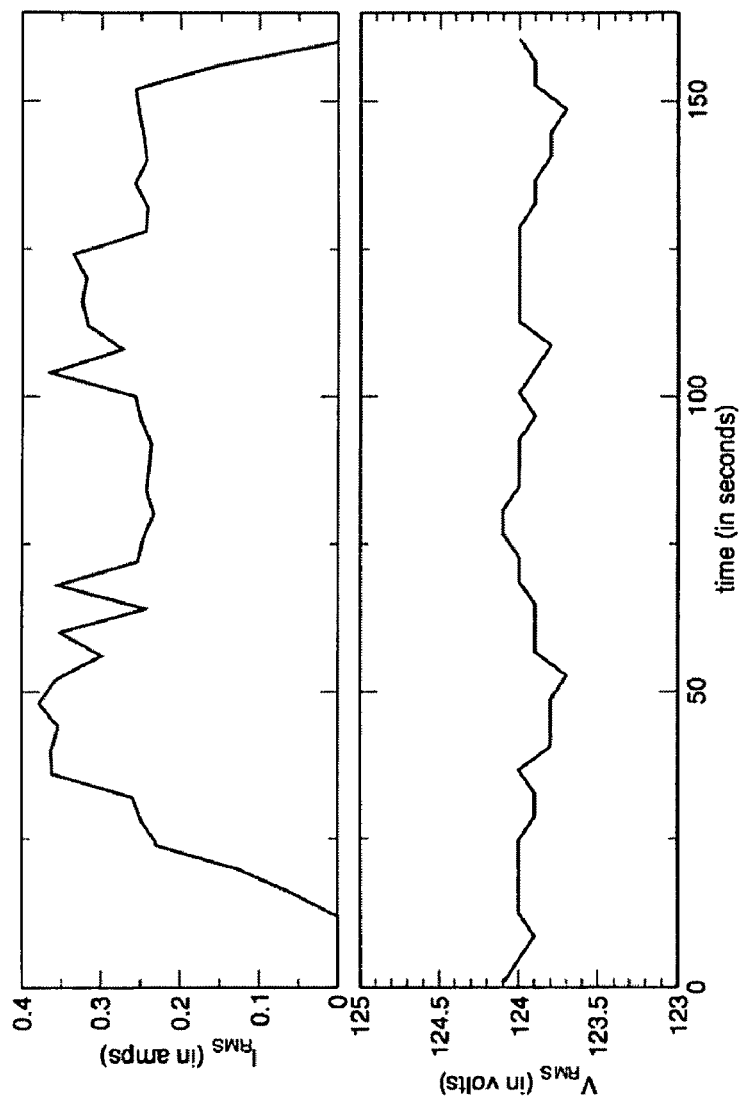

At a minimum, the OMD system collects electrical data for every appliance that is plugged into the OMDs 12. The electrical data indicates how voltage and current are drawn by an appliance as a function of time, as shown in FIG. 8. It should be understood that these time-resolved voltage/current waveform data comprise generic electrical properties of the appliance and can be obtained by conventional metering devices.

However, in accordance with a method embodiment of the present disclosure, further advantages are provided in addition to the mere collection of voltage/current data. Specifically, in accordance with embodiments of the invention, increased accuracy of appliance identification may be achieved by utilizing information that is uniquely available through proprietary OMD data collection devices, as taught in co-pending application Ser. No. 12/284,051, incorporated herein in its entirety, in concert with a centralized data collection system. The centralized data collection system provides capabilities for associating demographic (e.g., age, sex)/geophysical (e.g., outlet location, time of day) data with the collected voltage/current waveforms. Since these demographic/geophysical data are orthogonal in their information content to basic waveform data, their use provides further discriminative power.

Section IV.1 Basic Components of an Appliance Signature

In the next few sections, an embodiment is presented for creating a data construction referred to herein as an "appliance signature" that can be used to tag and identify appliances that are coupled to a proprietary OMD system, as taught in co-pending application Ser. No. 12/284,051. The appliance signature is comprised of two essential features, namely, electrical and non-electrical (e.g., demographic and geophysical) features that are uniquely characteristic of the coupled appliance and which are accessible via the proprietary OMD system as discussed above. Importantly, it is noted that accurate identification of appliances from their appliance signatures is critically dependent on what information is contained in these signatures. Most notably, the inclusion of modes of operation, paths, and transitions, which will each be explained in detail below, is critical for controlling the extrinsic noise arising from the many ways people use their appliances.

In one embodiment, the appliance signature will have electronic components, which are data properties obtained from the appliance waveform collected and transmitted by an OMD device 12 coupled to an appliance 4. In addition, the appliance signature will have non-electronic components, which are data independent of the waveform that are transmitted from the OMD device 12 or otherwise directly supplied by the user via the system controller 50. Examples of the latter are demographic and geophysical data.

Section IV.2 Electronic Signature Components

There are several common characteristics that are shared by all appliance waveforms: (a) modes of operations, (b) paths, and (c) transitions. When the system controller 50 receives an appliance waveform for analysis, these three characteristics are used to characterize the appliance waveform. A pictorial illustration of the electronic signature components for a typical appliance signature is provided in FIG. 12.

Modes of Operation

All long time appliance waveforms feature moments of steady-state voltage/current draws. These moments of steady-state behavior are associated with a specific mode at which the appliance is operating. For example, an air conditioner might have three user settable modes of operation: "power saving" mode, "high" setting, "vent" setting. These modes of operation need not be discretely defined in some appliances, as illustrated by a dial on a toaster. In other cases, modes of operation may not be transparent to the end-user. As shown in FIG. 8, the sequence of modes of operation observed for the Apple laptop power supply are being managed by the battery management hardware/software that is not accessible to the user.

When an appliance attains a particular mode of operation, the voltage and current drawn by the appliance is expected to have regular characteristics. That is, for a given mode of operation the voltage/current draws may fluctuate around a constant level or be periodic with a well-defined frequency spectrum. If the appliance's mode of operation changes, the voltage/current draw is expected to shift to a new set of regular voltage/current characteristics that defines the new mode of operation. In the case where the modes of operation are continuously distributed (an appliance with a dial), we will simply discretize the observed modes of operation into a reasonable number of groups. The on and off states of the appliance are considered modes of operation as well. For ease of explanation, the i-th mode of operation of an appliance 4 is denoted as $M_i$.

Figure 12:
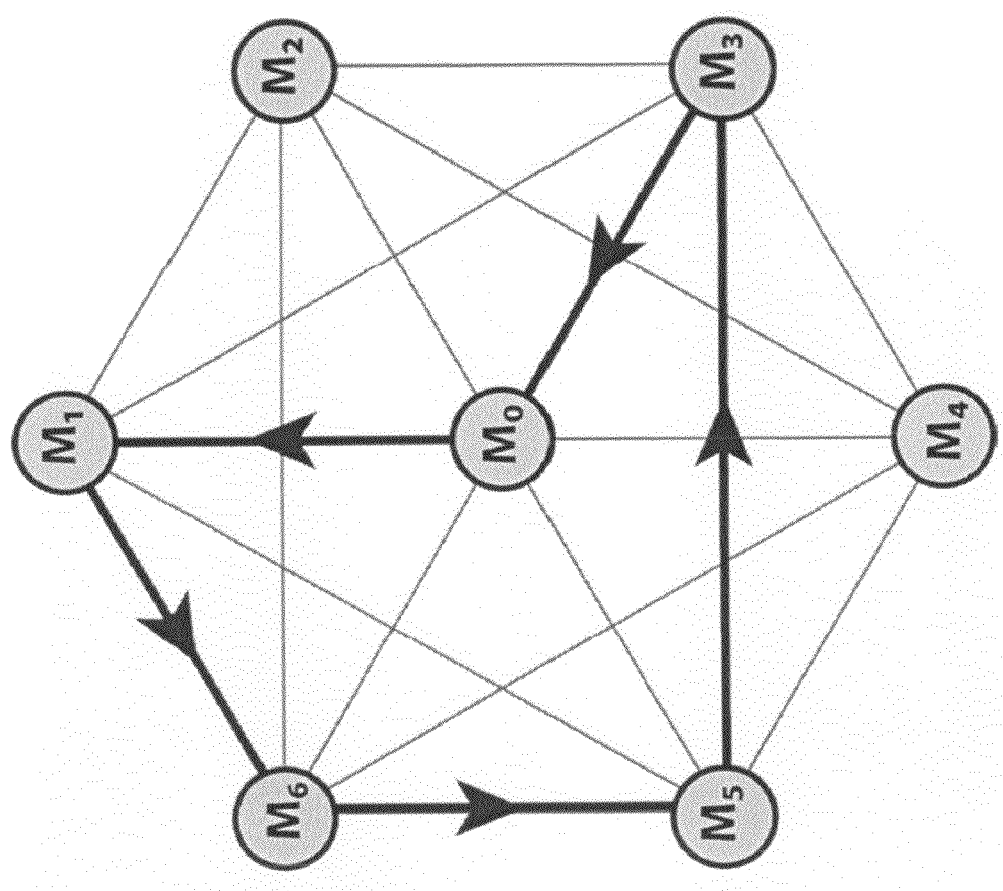
FIG. 12 is a pictorial representation of the electronic components for a typical appliance signature.

FIG. 12 is a pictorial representation of the electronic components for a typical appliance signature. The green circles represent the modes of operation, which are labeled "$M_0$", "$M_1$" through "$M_6$". The "$M_0$" mode signifies the OFF state of the appliance. The dark arrowed line, namely the one that visits the following modes in the order "$M_0$"→"$M_1$"→"$M_6$"→"$M_5$"→"$M_3$"→"$M_0$", represents a path through modes of operation. Each step along this path, e.g., "$M_0$"→"$M_1$", "$M_6$"→"$M_5$" and "$M_5$"→"$M_3$", represents a transition.

Paths

Suppose, for example, that N modes of operation for a particular appliance, denoted $M_1$, $M_2$, ..., $M_N$, have been identified. By default, let $M_0$ be the off state of the appliance. When an appliance is turned on, used, and eventually turned off, we expect the waveform of the appliance to start at $M_0$ (the off state), then sequentially visit different modes of operation, and finally end at $M_0$. In other words, using an appliance 4 can be represented as a path through modes of operations. Mathematically, a path, P, is represented as a sequential walk passing through different modes, $P = M_0 \to \ldots \to M_i \to \ldots \to M_0$, where the arrows indicate transitions between the origin and destination modes (see FIG. 12). Note that the number of intermediate modes with index i are arbitrary and the index i can take on any value between 1 and N. The path captures the intuitive notion of using an appliance since (1) the appliance must be turned on and (eventually) off and (2) the appliance may enter any number of well-defined modes, whether manually or automatically.

Transitions

Each transition between modes along a path is identified by transient voltage/current changes as the appliance takes on voltage/current characteristics of the destination mode. In most modern appliances, these transitions are predictably regular, as they protect the appliances from unexpected voltage/current surges and drops. Depending on the appliance and the origin/destination modes, these changes can be gradual or fairly sudden. It is therefore assumed that each transition $M_i \to M_j$ should have a characteristic short-time waveform. Transitions should be definable for movement from (and to) the ON (OFF) states. When the appliance is turned on, a transient increase is observed in the voltage/current drawn by the device from the off state (i.e., zero voltage and current) until a new modes is attained. Finally, when the appliance is turned off, a transient decrease is observed in the voltage/current from the final mode to the off state.

Section IV.3 Electronic Signature Component Construction

The OMDs 12 first communicates the long-time waveform for an unknown appliance to the system controller 50 through the WTMM interface 67 (see FIG. 1C). The appliance signature creator software 65 residing on processor 58 receives these input waveforms and constructs the three key electronic components of an appliance signature according to the following procedure, which at a top level, includes (1) identifying and characterizing the appliance's modes of operation, (2) identifying paths, and (3) identifying and characterizing transitions.

Each input long-time waveform (e.g., voltage waveform, current waveform) are divided into regions of regularity characterized by extended time periods of regular variation, which are typically (a) constant or (b) periodic current/voltage draws. In one embodiment, a linear programming method is used to find an optimal way to divide each voltage/current waveform. In one embodiment, Fourier spectrum analysis can then be used on a divided waveform to check whether the waveform variations are regular. The identified regions of regularity are compared and grouped according to similar waveform properties: voltage/current levels, power spectrums, or other waveform characteristics. These regions are designated as the appliance's modes of operation. Each mode of operation will also be characterized by the set of waveform properties, which are averaged across all instances of the same mode of operation. On a case-by-case basis, the described procedure is optimized to (1) maximize the total amount of time an appliance spends in modes of operation, (2) maximize average similarity within modes of operation, or (3) minimize the number of modes of operation identified. In some embodiments, noise filtering may be necessary on the waveforms to verify and refine the identification. As more waveforms of the same appliance are collected over time, the steps described above are repeated to improve the quality of the mode of operation identifications.

After the modes of operation have been identified and labeled for the input long-time waveform, the input waveform can be reduced to a sequence of modes of operations visited by the appliance. This is the path taken by the appliance as it was used. If the appliance was used in a similar manner during two different input waveforms, we expect the path abstracted from each input waveform to be similar. Likewise, we expect the path from an input waveform collected each time an appliance was operating under a fixed computer algorithm to be very similar, if not identical.

Finally, along a path, there are moments whereby the mode of operation switches. The short-time waveform recorded by the OMD 12 as this step takes place, from the starting or origin mode of operation to the final or destination mode of operation, is the transition waveform. Thus, each transition can be described by the identities of the origin and destination modes of operation, and the electronic properties of the short-time waveform associated with this transition. Examples of these waveform properties are (a) the starting and ending voltage/current, (b) the rise/fall times of the voltage/current, (c) oscillations at characteristic frequencies, and (d) characteristic noise levels. If multiple instances of the same transition are observed in the input waveform or over multiple input waveforms, the waveform properties for transitions that share origin and destination modes of operation are averaged. Each mode of operation transition will therefore be characterized by this averaged, prototypical set of waveform properties.

The final result of applying the processes described above represent the electrical components of the appliance signature. Symbolically, the electrical components of an appliance signature can be represented as:

A set of modes of operation: $M=\{M_0, M_1, \ldots M_N\}$

A set of waveform properties that characterize each mode of operation: $p(M_i)=\{p_1(M_i), p_2(M_i), \ldots, p_n(M_i)\}$ A path observed in the input waveform: $P=\{M_0 \rightarrow M_a, T(M_a \rightarrow M_b), \ldots, T(M_1 \rightarrow M_0)\}$ A set of transitions: $T=\{T(M_0 \rightarrow M_a), T(M_a \rightarrow M_b), \ldots, T(M_1 \rightarrow M_0)\}$ A set of waveform properties that characterize each transition: $p(T(M_i \rightarrow M_j))=\{p_1(T(M_i \rightarrow M_j)), p_1(T(M_i \rightarrow M_j)), \ldots, p_m(T(M_i \rightarrow M_j))\}$, where N is the set of all modes of operation observed for the appliance across all recorded input waveforms, n is the number of properties used to characterize a mode of operation, and m is the number of properties used to characterize a transition. Since only modes, path, and transitions found in the input waveform are part of the appliance's electronic signature, the dimension of the set T may be considerably smaller than its maximum size ($=N(N-1)/2$), which represents the case when every possible transition between all known modes of operation was observed.

Section IV.4 Non-Electrical Signature Component Construction

In one embodiment, each collected waveform is associated with the time and of day and location at which the input waveform was recorded, along with any additional data that the user has associated with the recording OMD 12 at a set-up stage. The time and location of data collected by the OMD 12 will constitute "geophysical data." During setup, users are encouraged, through a GUI type interface at the system controller 50, to provide additional data, such as "demographic data," which includes, for example, sex, age, and occupation. Upon receiving user input, processor 58 will execute the user response validation software 61 to ensure that the responses are trustworthy.

Unlike electronic data, to construct the non-electrical data component of the appliance signature, the geophysical and demographic data requires minimal algorithmic processing. Examples of data processing involved would include histogramming over different categories, interpolation, and noise reduction.

The non-electrical data component of the appliance signature is constructed by associating each of the afore-mentioned modes of operation, paths, and transitions with the user provided geophysical data (e.g., time of day) and the user provided demographic data (e.g., sex, age, and occupation). It is noted that while the non-electronic signature component provides information that is unrelated to the electronic signature, this information is useful for differentiating appliances whose electronic behavior are similar.

Section IV.5 Complete Appliance Signature Construction

Finally, a complete appliance signature of an input waveform is constructed by combining the electronic components (modes, paths, and transitions, and the associated waveform properties of modes and transitions) with the non-electronic components (geophysical and demographic data) into a single data structure such as an array. Processor 58 will use the appliance signature matching algorithm 63 residing in the form of software on system controller 50 to compare this constructed appliance signature against the canonical signatures stored in database 56. Further details on canonical signatures and the appliance matching algorithms are provided immediately below.

Section V. Canonical Signatures

A canonical signature is uniquely associated with a single (or a set of closely related) appliance(s), and must contain the essential characteristics of all signatures potentially generated from the associated appliance(s). For example, all waveform signatures collected from a certain laptop should be most closely related to the canonical signature associated with that particular type of laptop. In contrast, it is expected that all generic 60W desk lamps, regardless of brand, to be characterized by a single canonical signature.

It should be appreciated that a single waveform signature will only provide a partial sample of the information content that is in the canonical signature. First, not all modes of operation characteristic of the appliance may be recorded. Second, only one path is associated with each signature, so only a small subset of possible transitions is likely contained in a single signature. Finally, the non-electronic data will only reflect the characteristics of a single use event.

Ultimately, determining the canonical signature for an appliance is a data-driven process. This is because there are no physical laws that enable one to logically deduce a canonical signature for a particular appliance using a small number of waveforms. The construction of an accurate canonical signature for an appliance requires one to generalize a statistically significant number of signatures collected for that appliance.

Section V.1 Basic Components of a Canonical Signature

Given the afore-mentioned considerations, once a sufficiently large number of waveform signatures have been collected that correspond to the same known appliance, a canonical signature can then be created in a multistep procedure. Since a canonical signature is a summary representation of multiple input signatures for a given appliance, the components that make up the canonical signature are statistical generalizations of the analogous components in the input appliance signatures. In particular, the components of a canonical signature are (1) generalized modes of operations, derived from a statistical sample of particular modes of operation (2) generalized paths, derived from a statistical sample of particular paths (3) generalized transitions, derived from a statistical sample of particular transitions and (4) generalized non-electronic data. In the embodiment to be described below, generalized paths are represented as transition matrices and the generalized non-electronic data may be represented as specialized forms of modes, transitions, and transition matrices. For example, a demographically-based use preference can be defined by a separate transition matrices, $T_{user}$, that is obtained by constructing the transition matrix from a cross-section of the path data that corresponds to the relevant demographic.

Section V.2 Canonical Signature Construction

The method embodiment for computing each component of the canonical signature is now discussed in detail.

The modes of operation are generalized by forming a union of all modes of operation observed across the input signatures. In one embodiment, this is achieved by using a clustering method that involves grouping the modes into subsets of similar modes (i.e., clusters), where similarity is measured by waveform properties associated with each mode of operation. In this manner, each set of clustered modes represents a distinct mode in the canonical signature.

Next, transitions are generalized by matching the modes found in the input signatures to the generalized modes identified using the method outlined in section V.1. Each mode in the input signatures will now be identified with a particular generalized mode. Scanning all possible pairs of origin and destination modes in the input signatures, we average the waveform properties associated with all observed transitions that have the same origin and destination pair of generalized modes. This results in a set of averaged transition waveforms that characterize the generalized transitions in the canonical signature.

Finally, the paths are generalized from the paths observed across the input waveforms as follows. Notably, these observed paths are of varying lengths. The number of theoretically possible paths of arbitrary lengths, which amounts to the number of different ways to use an appliance, is a combinatorially large number. With limited resources, storing all observed paths is computationally impossible. However, in practice, many of the observed paths are expected to be redundant, because certain path segments are strongly preferred over others. Some of these preferences are hard wired into the appliance. For example, once in the spin cycle, a washing machine will never on its own reenter the wash cycle. Other preferences are determined by the user. One user may strongly prefer to vary the wash cycle temperature, while another might do all of his wash at the default temperature. As a result of these preferences, we can accurately form appliance-specific probability distributions that provide the likelihood for observing a particular path.

In one embodiment, as is well-known to those in the mathematical arts, using Markov chain theory, a binary path preference may be represented by a transition probability $p_{ij}$ between two modes $M_i$ and $M_j$. These probabilities do not have to be symmetric in i and j, that is, $p_{ij} \neq p_{ji}$. Transition probabilities are determined by analyzing the input waveform paths. The entire set of binary path preferences can be summarized in an N×N transition matrix, T, where the $(i,j)^{th}$ element is given by $p_{ij}$. Given these binary preferences, a specific path can be obtained by multiplying together the transition probabilities that correspond to each step along that path. A result of this particular embodied process is a transition matrix that characterizes the generalized paths in the canonical signature.

We note that the transition matrix formalism for binary path preferences can be readily extended to higher order path. Preferences are captured by an N×N×N transition matrix, and so on for higher order paths. Higher order path preferences will lead to a canonical signature that is richer in information, but more burdensome for data storage. Whether higher-order path preferences are needed for appliance detection accuracy is answered in practice. The preferred embodiment is centered on binary paths.

The non-electronic data is generalized using standard statistical methods, including averaging the geophysical and demographic data associated with the input waveforms to identify statistical trends. The preferred method embodiment is the determination of correlations between geophysical/demographic parameters and appliance usage patterns as represented by generalized modes, generalized paths, and generalized transitions. Examples of non-electronic data generalizations in this embodiment are (1) the generalized modes and paths that are preferred by certain types of individuals, (2) the modes and paths are preferred during a particular part of the day, and (3) where in the house is the appliance most used.

To summarize, the canonical signature is constructed by combining the generalized electronic components, that is (1) generalized modes of operation, (2) generalized paths, where binary transition matrices are the preferred embodiment, and (3) generalized transitions, and (4) the associated average waveform properties of the generalized modes and generalized transitions, with the generalized non-electronic components into a single data structure such as an array. This process is performed by processor 58 by executing the appliance signature creator algorithm 67 residing in the form of a software module (i.e., computer code) on system controller 50.

Section VI. Canonical Signature Database

It should be appreciated that canonical signatures provide standards against which appliance signatures are compared. The same appliance, if used in the identical fashion, should yield the same appliance signature to within intrinsic noise levels. However, the same appliance, if used by a different person under a different circumstance, should generate different appliance signatures to within extrinsic noise levels. The canonical signature is designed to mitigate the effects of such noise. Since the canonical signature is constructed as a generalization of appliance signatures corresponding to the same appliance, we expect a given appliance signature, regardless of the circumstance under which it was collected, to be most similar to its corresponding canonical signature. In this manner, the key task of identifying an appliance falls on matching an input signature against a database of canonical signatures whose appliance identities are known. Being standards for comparison, all canonical signatures that have been constructed from OMD data over time must be stored in a redundant and secure fashion. In one embodiment that satisfies this requirement, the canonical signatures are stored in the archive database 116 as part of the system management node 102.

Theoretical requirements to be placed on the Canonical Signature Database (CSD) are (1) data organization that allows for rapid signature matching and (2) explicit mechanisms for ensuring data quality. These two requirements affect the speed and accuracy, respectively, of appliance detection.

As both of these requirements pertain to the content of the archive database 116, the system management node 102 will responsible for tasks related to these requirements. In particular, if large data volumes are involved, the cluster front end 106 will dispatch commands related to CSD maintenance, such as reorganizing the CSD records, to the distributed computing nodes 112. As these commands are executed, temporary data storage are provided by the transient database 110 and the NAS 108. Once CSD maintenance has been completed, processor 114 will ensure that the CSD is properly archived in database 116.

VI.1 Data Organization of the Canonical Signature Database

Canonical signatures must be intelligently organized to circumvent drawn out searches in a signature matching process. For example, based on a simple estimate that there are at least 1,000 different types of appliances (e.g., clock radio, TV, VCR, etc.) and at least another 1,000 distinguishable brands, a sum total of 1 million canonical signatures would be needed to be stored in the canonical database. If the data were to be stored in a linear array, an unknown appliance would require, in the worst case, 1 million comparison operations. Even if each comparison took as little as 1 ms, a single signature matching process would require an impractical 20 minutes. In one embodiment, this problem is overcome by creating an abstract method for measuring the similarity between two canonical signatures and a tree-based classification system using this measure, to be described as follows.

In its most general form, a canonical signature S is a set of properties $P_i$, such as generalized modes and generalized paths (e.g., transition matrices), that are characteristic of that appliance: $S=\{P_1, P_2, \ldots P_n\}$. For each type of property, we define a comparison function that takes two property values and produces a numerical value characteristic of their difference. The comparison function for different types of properties does not have to be the same. For example, if the property is a matrix (as in the transition matrix), then a logical choice for the comparison function is the average absolute value difference between corresponding matrix elements. Because each property is independent of one another and emphasizes a unique aspect of an appliance, when measuring similarity between two signatures, all properties should be considered. For this reason, the similarity between two appliances is best captured as an n-dimensional vector, where the i-th element corresponds to the value of the i-th comparison function. Expressed mathematically, the similarity vector $\Delta(A,B)$ of two canonical signatures $A=\{P_1, P_2, \ldots P_n\}$ and $B=\{Q_1, Q_2, \ldots Q_n\}$ is given by:

$$\Delta(A,B) = (f_1(P_1,Q_1), \ldots, f_1(P_n,Q_n)) \quad \text{Eq. [1]}$$

For a universe consisting of N appliances, there are $N(N-1)/2$ similarity vectors. These similarity vectors provide a method for quantifying canonical signature similarity, which lays the groundwork for an intelligent canonical signature classification system.

Section VI.2 Classification Based on Unsupervised Learning Methods

Since there is no a priori information for deciding which canonical signatures are to be grouped together, there is no correct answer for this classification problem. In the language of machine learning, this classification problem may be termed as unsupervised. Accordingly, existing, well-known unsupervised classification methods, such as hierarchical clustering, are utilized. A distance measure is first defined, where the measure converts the difference vector into a numerical quantity that reflects canonical signature similarity. One possible distance measure is the weighed sum of all the comparison functions:

$$d(\Delta(A,B)) = \sum_{i=1}^{n} \alpha_i f_i(P_i, Q_i) \quad \text{Eq. [2]}$$

where $\alpha_i$ are non-zero numbers. The $\alpha_i$ values are weights that determine the contribution each property type makes to this numerical measure of overall difference. In one embodiment, using this distance measure, a hierarchical clustering method (such as average linkage) is applied. The end result is a tree (or dendrogram), which represents how canonical signature clustering varies with the distance cutoff value. In one limit, it is clear that a very small cutoff (i.e., a very stringent definition for similarity) will lead to each canonical signature being considered its own "type." In this case, if we have N canonical signatures, we will have N clusters. However, as we increase the cutoff (i.e., relax the definition for similarity), we expect some of these N clusters to merge together into a single cluster. Eventually, for a high enough cutoff value, all the clusters will have merged into one, and all canonical signatures will considered as part of a single type. Finally, a distance cutoff value needs to be rigorously chosen in order to decide on the final clustering of canonical signatures. This choice is based on, among other things, (a) how robust are the cluster definitions to different initial data sets and (b) how much additional information is gained from further clustering.

At the end of this classification procedure, we expect a tree-like organization of canonical signatures. Each branching event of this tree will indicate where a large cluster divides into two smaller one. With the canonical signatures in the database organized as a tree, the time involved in matching an unknown signature to its cluster will scale logarithmically with the number of signatures. This is a significant time advantage, particularly as the database grows larger.

It should be understood that the results of this classification may not exactly match an intuitive notion about appliances, however desirable it may be. One intuitive organization method may be to organize appliance first according to type, then perhaps by brand and/or demographics. The basic reason for this disparity is that an intuitive classification is based on human perceivable properties (such as usage patterns) alone, while the canonical signature is a richer information structure that encompasses everything: electrical, usage patterns, demographics, etc. It is therefore not surprising that an algorithm that utilizes only canonical signatures may yield results that differ from intuition.

In another embodiment, if it is desired to match the algorithmic results with intuition, this can be achieved by altering our distance measures (for example, by changing $a_i$ parameters) to obtain the desired classification.

Section VI.3 Data Quality of the Canonical Signature Database

Since canonical signatures are used as standards for comparison, the information contained in the Canonical Signature Database must be as error-free as possible. In CSD, there are two external sources of error that need to be addressed.

The first source of external error is statistical in nature. Because many people own the same appliance and use it multiple times, we expect a very large number of signatures to be collected per appliance over time. In the CSD, we expect these data to be summarized in a smaller number of canonical signatures that characterizes the appliance. Clearly, the errors associated with forming these canonical signatures are a function of (1) how many individual signature instances one has (sample space size) and (2) how narrowly distributed the individual signature characteristics are (standard deviation). Fortunately, these types of statistical errors are commonplace in data-mining applications, and as a result, many theoretical methods have been developed to control them. It is contemplated to use one or more of these methods as needed.

The origin of the second source of external error is human. This source of error only affects the non-electronic data, which may require user input. The veracity of these data cannot be guaranteed because they may be, purposefully or not, incorrectly input.

An obvious solution to this problem is to remove the user from the data inputting task as much as possible. This can be readily done for geophysical data at an additional cost. In some embodiments, time-of-day can be accurately determined by placing a calibrated battery-powered clock in the OMD 12 or placing an on-board receiver for an official NIST time signal. The relative location of OMDs 12 can be obtained by measuring the strength of received wireless radio signals from nearby OMDs 12. If this relative location data is combined with the absolute location data obtained through a GPS chip at a single OMD receiver, then the absolute location of the entire OMD network are determined.

Unfortunately, this fully automated solution does not work for non-geophysical, non-electronic data, since the user is the only point of verification. However, a partially automated solution may be more practical. In accordance with such a solution, after the user's identity has been initially recorded on the system controller 50 through a one-time only registration system, the user's identity can be automatically detected using a key fob (or something similar, such as an RFID tag or fingerprint recognition system). Once the user's identity is known, the user may be qualified in terms of trustworthiness as a data source. In one embodiment, this qualification is determined in a two-step procedure by the user response validation algorithm 61 residing in the form of software on processor 58. First, all data collected under this user is compared against corporate data for people with similar demographic profiles. Second, if in this analysis, the pattern emerges that the user is more likely to send erroneous data, then that are considered an untrustworthy data source.

Section VII. Signature Matching

In one embodiment, to evaluate a signature match between a single instance of a sampled signal and a canonical signature, a multi-component scoring system is utilized whereby multiple scores are calculated when comparing an unidentified appliance signature (i.e., associated with an unknown appliance) against canonical signatures stored in a database. Each score are based on different parts of the appliance signature, which is comprised of several orthogonal, independent pieces of information: the modes, paths, transitions, and non-electronic data. The orthogonality facilitates the calculation of meaningfully distinct scores. For example, a score may be created based only on geophysical data that looks for matches based on when and where an appliance was used. This type of score should be very distinct in its information content from another type of score created using only electronic waveform characteristics. One advantage of generating multiple scores is that it provides multiple points of match verification, which significantly increases match accuracy. A consensus scoring system, which involves utilizing each score with different weighing, is used when making a final decision for determining whether a match exists between an unidentified appliance signature and one of the canonical signatures.

Section VII.1 Scoring Based on Classification Algorithms

It is likely that an appliance signature collected from a single appliance use represents only part of the information captured in a canonical signature. Underlying each canonical signature is a set of signature instances from which it was generalized. The task of signature matching is therefore equivalent to determining whether a particular signature can be viewed as a representative member of set of signatures underlying a particular canonical signature. Scores are effectively measures for classifying whether a signature belongs in a particular set of signatures. The theory behind classification algorithms, such as support vector machines (SVMs) and perceptrons, have been studied in great depth in machine learning and its use has become common practice in many technological applications. For this reason, we do not plan to create new theoretical approaches to classification, but rather, we will apply existing theories to our problem.

In one embodiment, a classifier distinguishing two sets of signatures would be constructed as follows. One simple type of classifier considered is a linear function based on the vector components of the difference between two signatures. Intuitively, this function provides the distance between the two signatures. The optimal classifier, which can be found by application of the SVM algorithm to a training data set, will provide the maximum separation between the members of each set. For a query signature, its distance to a particular set's boundary will constitute the matching score. By creating classifiers based on orthogonally defined distance functions, we are able to create different scores.

Section VII.2 Training Classifiers to Reduce False Positives

One fast signature matching method contemplated by the present disclosure is to use an optimal classifier that has been trained to maximize the mutual distance between canonical signatures. The highest scoring match for a query signature would therefore be the closest canonical signature. However, if multiple canonical signatures have similar distances from each other or if a particular canonical signature is poorly representative of the possible set of appliance signatures, we expect this approach to fail. In such cases, we will consider the slower process of comparing the query signature against the full set of signatures associated with the canonical signatures.

Regardless of the algorithm details, it is very desirable and useful to know the confidence level associated with a matching score. This is because during a rollout phase of the OMD system of the present disclosure, appliance identification mistakes will likely have a significant impact on whether customers continue to use the OMD system. From this point-of-view, it is desirable to query users for assistance in identifying appliances to the system. Thus, if it is known when to trust an appliance identification prediction, predictions should be offered only when they are qualified with high levels of confidence. This would reduce false identifications (false positives), and help maintain user confidence in the OMD system's appliance identifications. Confidence levels associated with these classifiers can be determined through standard controls such as jack-knifing and cross-validation. For example, if upon use of these controls, the classification boundaries shift significantly, the level of confidence is low. The preferred embodiment will feature these controls when classifiers are trained for scoring signature matches.

Section VIII Privacy Issues

As noted above, data are collected from each client residence 3 to a system management node 102. As a result, users of the OMD system may naturally have privacy concerns. While the OMDs 12 continuously records and stores data on each end user's computer (i.e., the system controller 50), this collected data is forwarded to the system management node 102 only when a new canonical signature is created or an existing canonical signature is enhanced. We anticipate these events to generally happen as a new appliance is introduced into the market. In one embodiment, these data are uploaded to the system management node only under customer consent. Furthermore, the communicated data are in the form of canonical signatures, which are significant abstractions of user-specific data, so that any information that can be tied to the personal identity of the end-user data are effectively removed Importantly, for the general process of appliance signature matching, no data ever needs to be uploaded from the system controller 50 to the system management node 102. This is because the entire or sufficient part of the Canonical Signature Database is downloaded onto the local database 56 on the system controller 50, so that the system controller 50 can execute the appliance signature matching algorithm 63 without needing to communicate to system management node 102.

Thus, the only situation where data may be uploaded from the user is during construction of the canonical signature database. If all users refused to allow this upload, the quality of our database could not be improved over time. However, this is an unlikely scenario once end users understand that the uploaded data cannot be traced back to the identity of the end users. It is further contemplated to entice end users to provide such data through incentive programs.

Section IX Flowchart of a Method Embodiment

Figure 2:
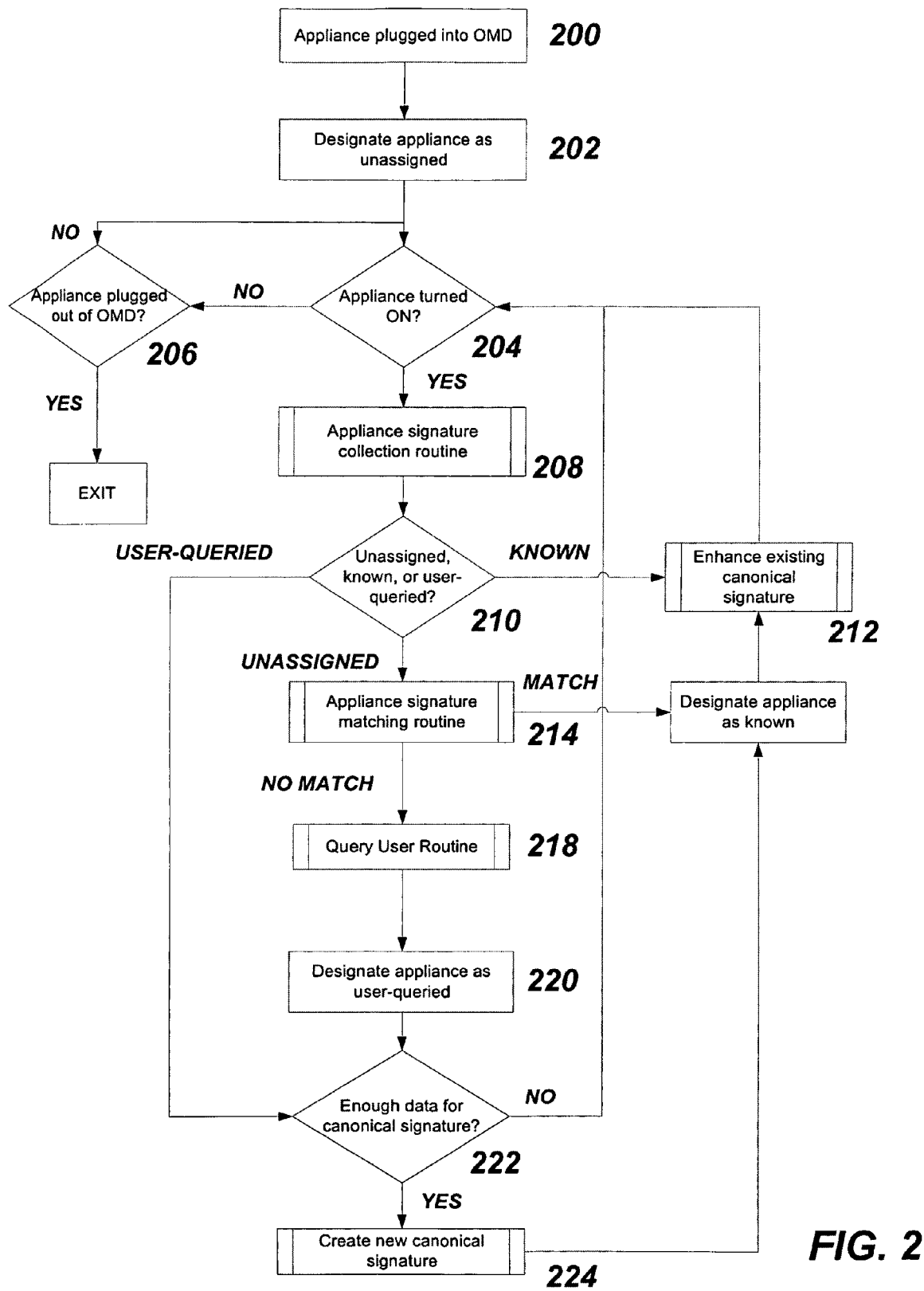
FIG. 2 is a top-level flowchart of the method embodiment of the identification and detection system of the present invention, according to one embodiment.
Figure 3:
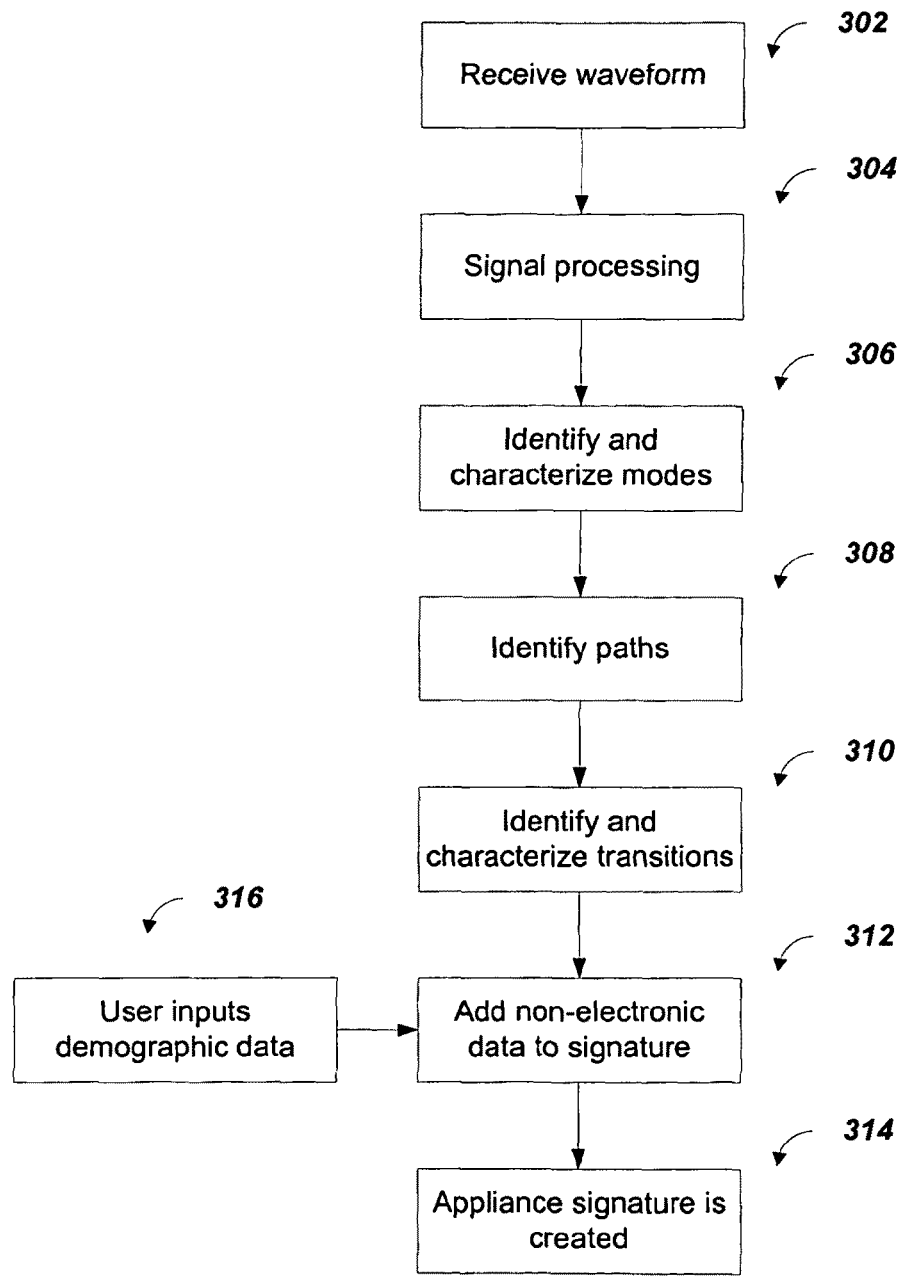
FIG. 3 is a more detailed flowchart of a method embodiment of the "appliance signature collection" process generally described at step 208 of FIG. 2.
Figure 4:
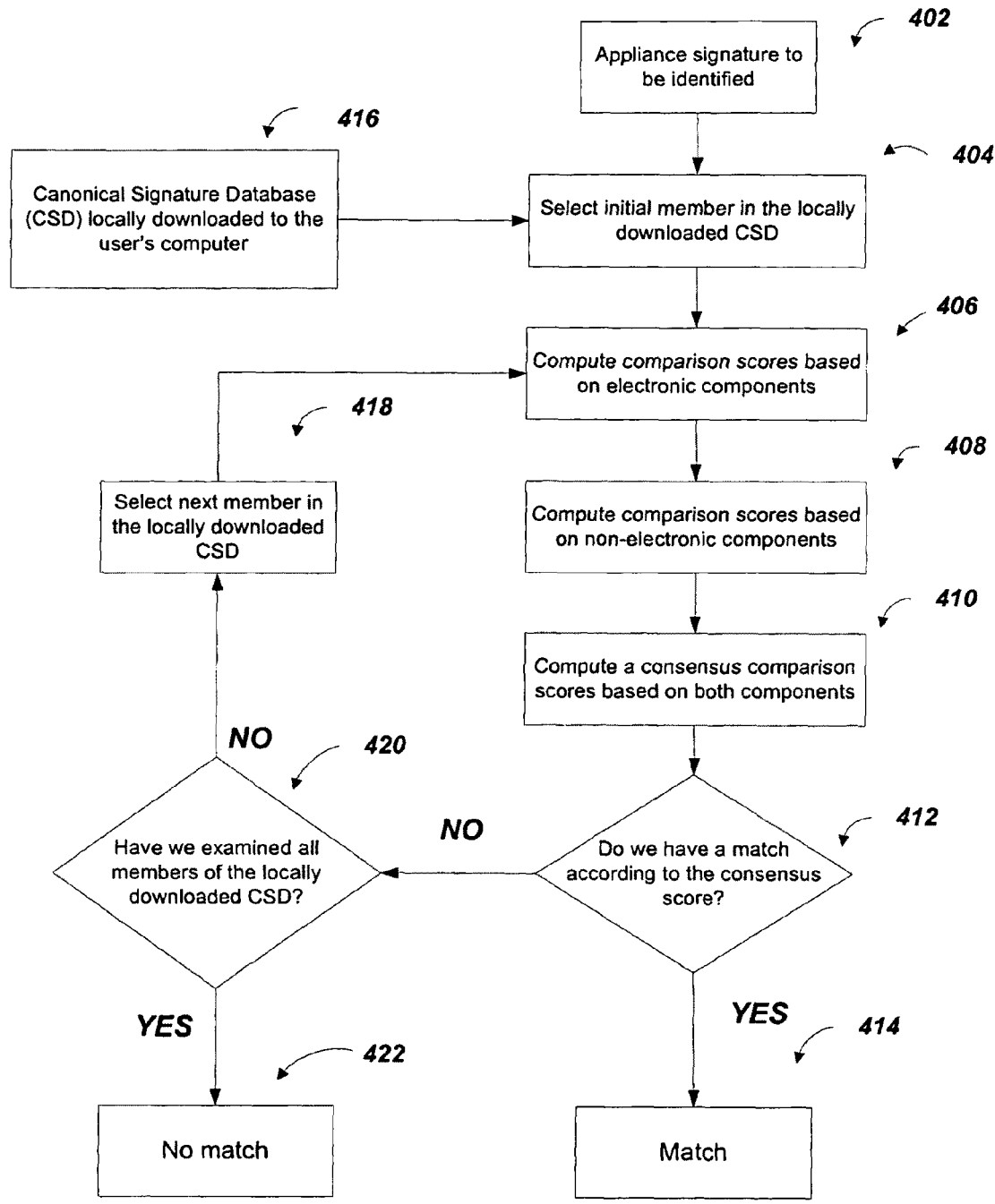
FIG. 4 is a more detailed flowchart of a method embodiment of the "appliance signature matching" process generally described at step 214 of FIG. 2.
Figure 5:
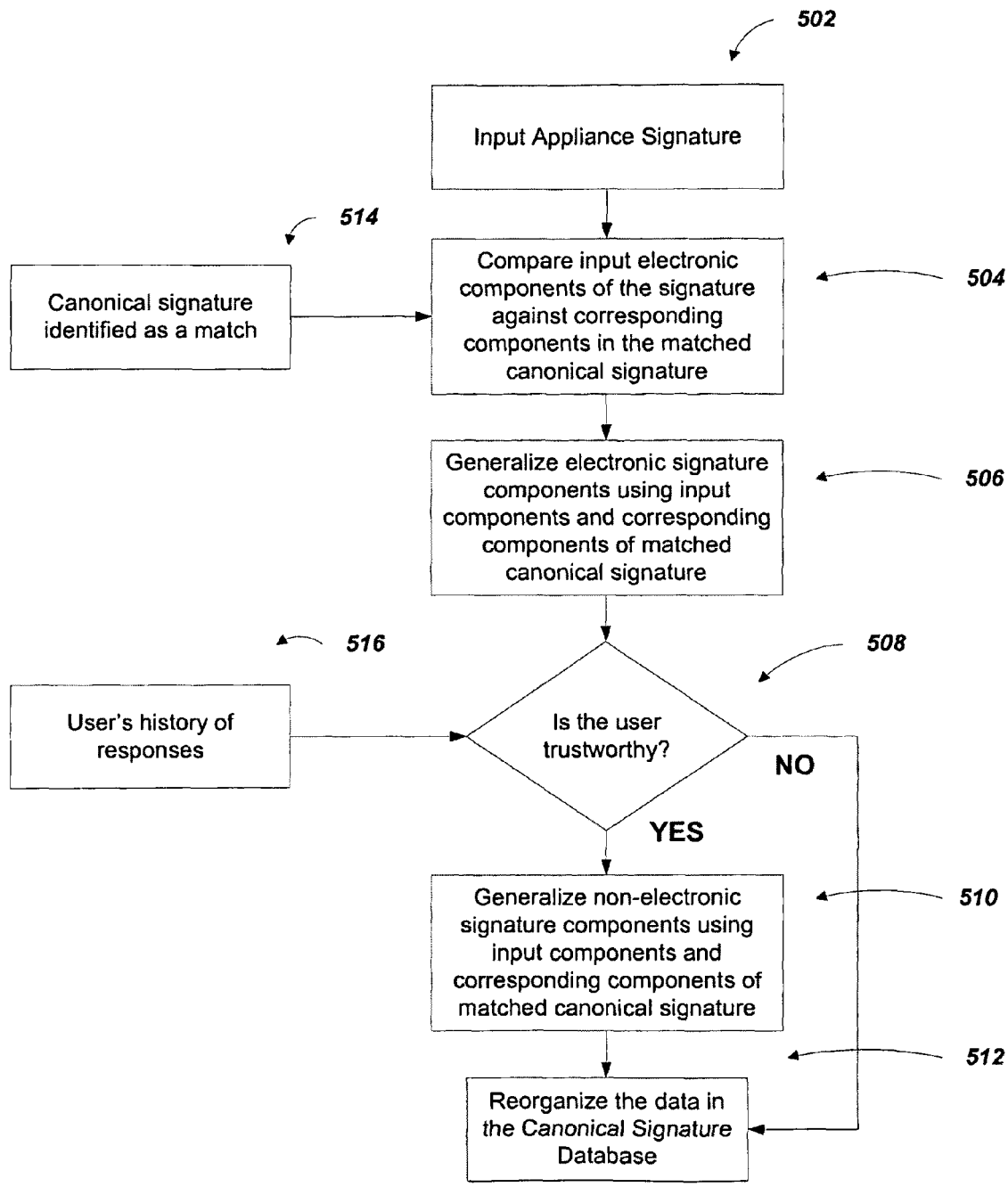
FIG. 5 is a more detailed flowchart of a method embodiment of a process for "enhancing an existing canonical signature" generally described at step 212 of FIG. 2.
Figure 6:
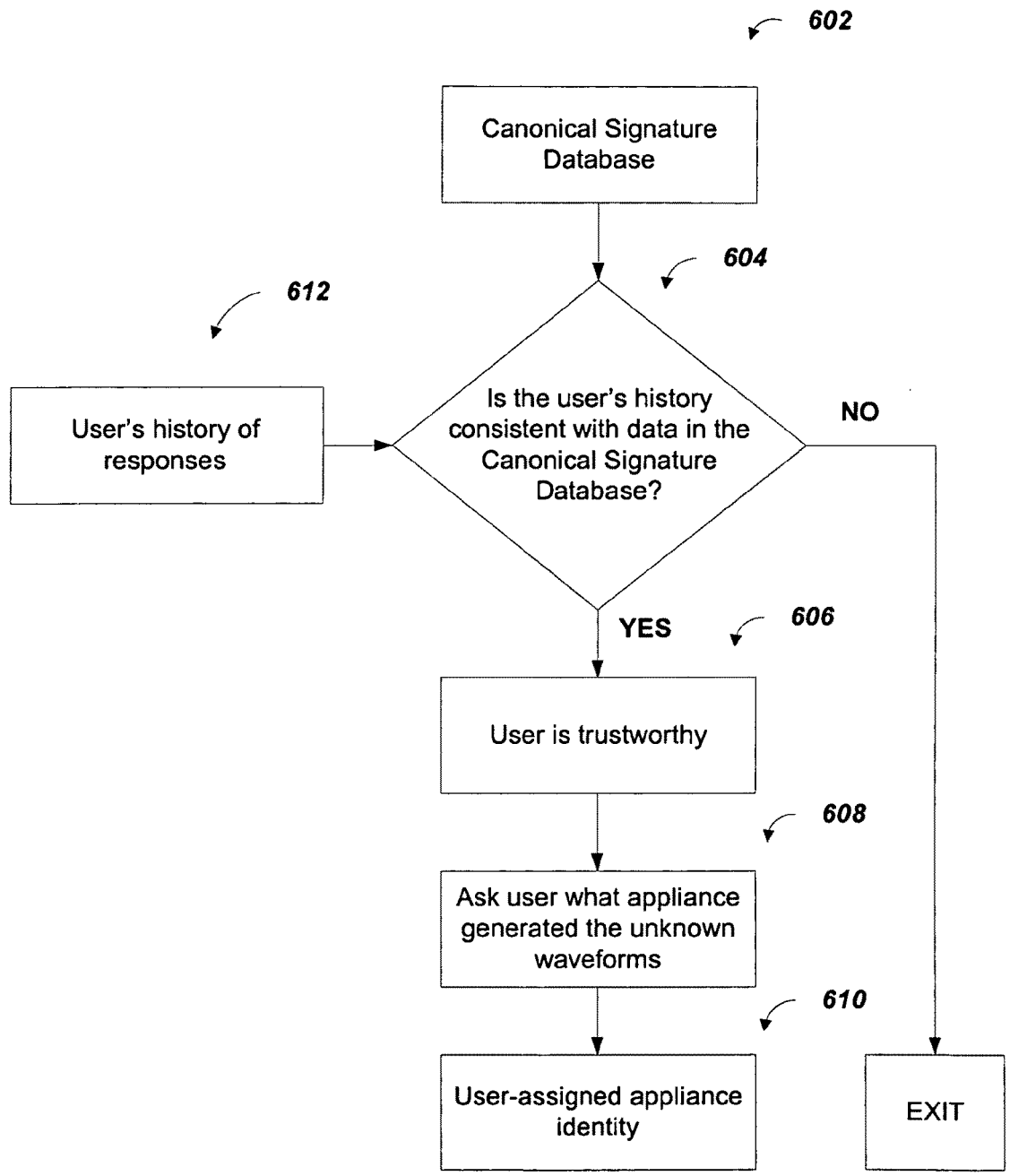
FIG. 6 is a more detailed flowchart of a method embodiment of the "query user routine" process generally described at step 218 of FIG. 2.
Figure 7:
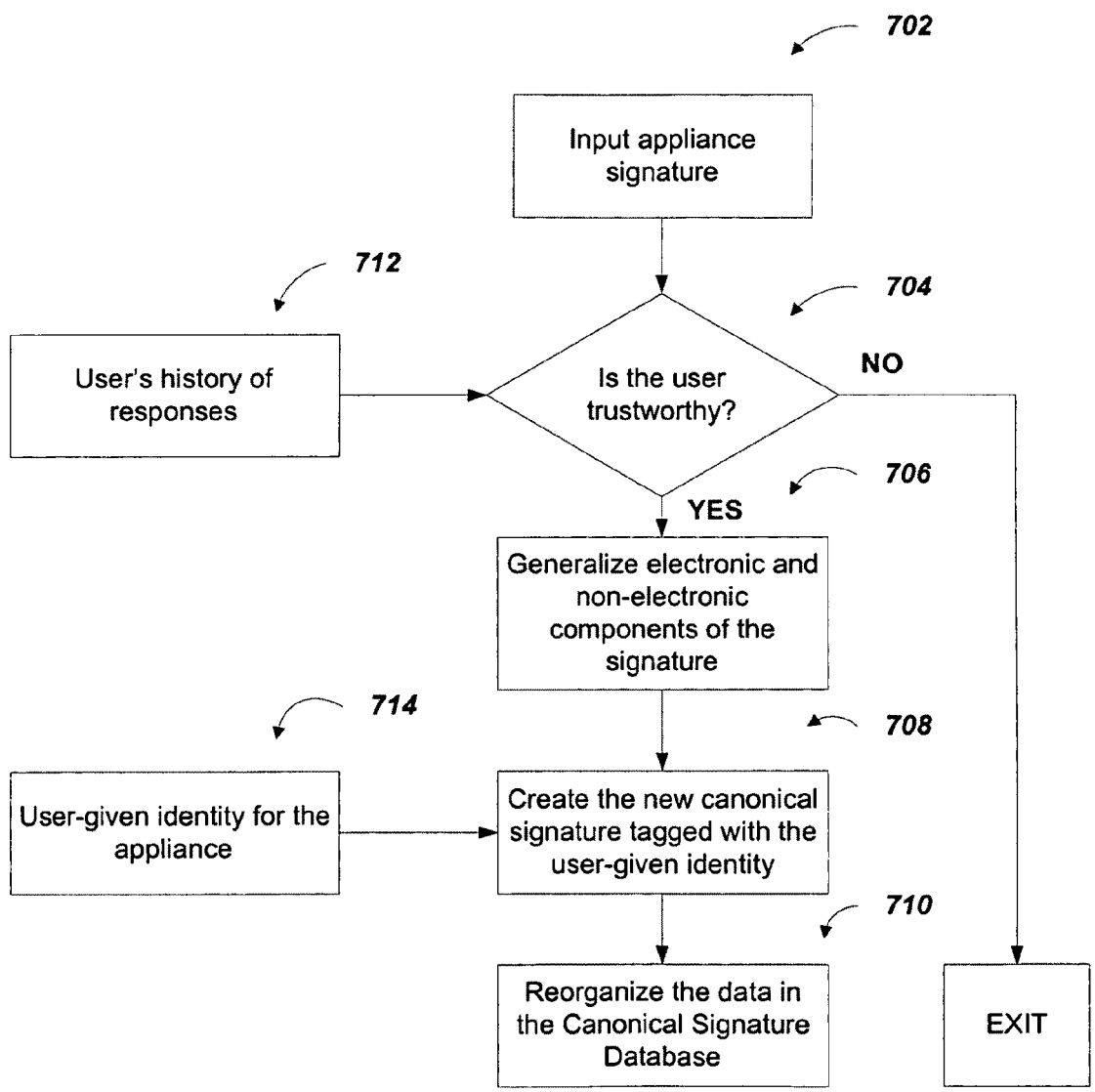
FIG. 7 is a more detailed flowchart of a method embodiment of the "create new canonical signature" process generally described at step 224 of FIG. 2.

FIG. 2 is a top-level flowchart of the method embodiment of the identification and detection system of the present invention. More detailed flowcharts are provided further below with regard to certain steps. For example, FIG. 3 is a detailed flowchart of step 208, the "Appliance signature collection routine". FIG. 4 is a detailed flowchart of step 214, the "Appliance signature matching routine." FIG. 5 is a detailed flowchart of step 212, "Enhance existing canonical signature." FIG. 6 is a detailed flowchart of step 218, "Query user routine." FIG. 7 is a detailed flowchart of step 224, the "Create new canonical signature."

At step 200, an unidentified appliance is plugged into an OMD device. At step 202, the unidentified appliance is assigned a temporary identification of being "unassigned." For example, consider a toaster that is plugged into the OMD. The OMD will send over the toaster's waveform data, but until the appliance signature is constructed at step 208, the toaster will be given an "unassigned" identity. At step 204, a determination is made regarding whether the appliance is turned on. If yes, the process continues at step 208. Otherwise, the process continues at step 206. At step 206, a determination is made regarding whether the appliance has been disconnected from the OMD device. The determinations at step 204 and 206 are made by a mechanical switch on each OMD device that activates the OMD device when an appliance is plugged in as taught in co-pending application Ser. No. 12/284,051. If yes, terminate, otherwise, return to step 204. At step 208, an appliance signature collection routine is performed (see the flowchart of FIG. 3). At step 210, a determination is made regarding whether the appliance identity is: (a) known, (b) unassigned, or (c) the user is queried to manually supply the signature because the appliance signature cannot be matched to a signature from a plurality of canonical signatures stored in database 56. In the case where it is determined that the appliance identity is known, the process continues at step 212. In the case where the appliance identity is unassigned, the process continues at step 214. In the case where it is determined that a user is queried, the process continues at step 222. Otherwise, in the case where the appliance signature cannot be matched, the user is queried to manually supply the signature. If there are enough signatures, then a new canonical signature is created, as generally described at step 224 of the flowchart of FIG. 2 and further described in detail with respect to the flowchart of FIG. 7.

At step 210, if it is determined that the appliance identity has not been assigned at step 210, an appliance signature matching routine is performed by processor 58 at step 214. A more detailed explanation of the signature matching routine is provided below with respect to the flowchart of FIG. 4. At step 214, if it is determined that there is a match between the input signature and one of the stored canonical signatures in the database 56, the identity of the appliance is designed as known, and its identity is assigned to be that of the matched canonical signature. The appliance signature may be used to improve the quality of the currently stored canonical signature stored locally on databases 56 and archived on database 116. This process is described in greater detail with respect to the flowchart of FIG. 5. After this, the procedure returns to step 204, so that more appliance signature data can be collected and used to improve the quality of the matched canonical signature.

At step 214, if no match between the appliance signature and any of the canonical signatures stored in database 56 is found, the query user routine is performed by processor 58 at step 218. This process is described in greater detail with respect to the flowchart of FIG. 6. In this process, because there is no record of the appliance identity in database 56, the user is requested to provide the identity of the appliance in question. If the user's response is validated as trustworthy, then the appliance's identity is assigned per the user's response. The appliance is then designated as user-queried at step 220. On the other hand, if the user's response is rejected as untrustworthy, then we return to step 204 to restart the appliance identification process with the appliance still designated as unassigned.

At step 222, a determination is made regarding whether the data underlying the appliance signature is sufficient for generalization into a canonical signature. In one embodiment, this determination is made by comparing, for example, the noise levels of the appliance signature components against typical canonical signatures. If it is determined that a canonical signature can be constructed, then the "Create new canonical signature routine" is performed by processor 58 at step 224. This process is described in greater detail with respect to the flowchart of FIG. 7. Upon the creation of a new canonical signature associated with the user-assigned identity, it is added to the archival database 116 in accordance to the classification used to organize the existing canonical signatures. This continues until the appliance is turned off or unplugged from the OMD.

Referring now to FIG. 3, which is a more detailed flowchart of a method embodiment of the "appliance signature collection routine" generally described at step 208 of FIG. 2. At step 302, a waveform is received at the system controller 50 from one of the OMD's 12. At step 304, the received waveform is subjected to typical signal processing algorithms by the WTMM 67, such as low-pass filters, to improve signal-to-noise levels. At step 306, a process is performed on the received waveform to identify regions of regularity in the received waveform by the appliance signature creator algorithm 65. Each received waveform (e.g., voltage waveform, current waveform) are divided into regions of regularity characterized by extended time periods of regular variation, which are typically (a) constant or (b) periodic current/voltage draws. In one embodiment, a linear programming method is used to find an optimal way to divide each voltage/current waveform. In one embodiment, Fourier spectrum analysis can then be used on a divided waveform to check whether the waveform variations are regular. The identified regions of regularity are compared and grouped according to similar waveform properties: voltage/current levels, power spectrums, or other waveform characteristics. These regions are designated as the appliance's modes of operation. Each mode of operation will also be characterized by the set of waveform properties, which are average across all instances of the same mode of operation. On a case-by-case basis, the described procedure is optimized to (1) maximize the total amount of time an appliance spends in modes of operation, (2) maximize average similarity within modes of operation, or (3) minimize the number of modes of operation identified. In some embodiments, noise filtering may be necessary on the waveforms to verify and refine the identification. As more waveforms of the same appliance are collected over time, the steps described above are repeated to improve the quality of the mode of operation identifications.

Having identified and characterized the various modes of operation of an appliance at step 306, path identification, as performed at step 308, comprises recording the order and sequence of modes of operation visited by the appliance over an extended time interval, typically greater than 10 seconds. A change in the mode of operation encountered during this time interval is considered a transition along this path. At step 310, transitions encountered along the identified path are identified by the origin and destination modes of operation and the characteristics of the waveform encountered between the origin and destination modes of operation. At step 312, non-electronic data is added to the signature. A key feature of the inventive system and method of the present disclosure is that non-electrical appliance data can be obtained. That is, each waveform is associated with the time of day at which it was recorded, and any additional data that the user has associated with the recording OMD device 12. Each user is encouraged through a GUI interface at the system controller 50 to type in the location where the OMD device 12 is plugged in. The time and location of data collected by the OMD will constitute the geophysical data. In some embodiments, the user will also be prompted for important demographic data, including sex, age, and occupation inputted at step 316. At step 314, an appliance signature is created.

Referring now to FIG. 4, which is a more detailed flowchart of a method embodiment of the "appliance signature matching" process generally described at step 214 of FIG. 2.

At step 402, an appliance signature to be identified is supplied as input to the appliance signature matching algorithm 63 which resides in the form of a software module (i.e. computer code) on processor 58. At some point in time prior to step 402, at step 416, the entire or sufficiently large part of the canonical signature database has been downloaded from the archival database 116 to the local database 56 on the system controller 50. At step 404, the first entry in the local copy of the canonical signature database residing on database 56 is selected as the comparison signature. At step 406, a first comparison score is computed using the electronic components of the input appliance and the selected comparison signature (see Eq. 1). At step 408, a second comparison score is computed based on the non-electronic components of the input appliance and the selected comparison signature (see Eq. 1). At step 410, a consensus comparison score is constructed from each of the first and second comparison scores computed at steps 406 and 408, respectively. At step 412, a determination is made regarding whether a match exists the input appliance signature and the selected comparison signature based on the consensus score. In the case of a match, the process continues at step 414, otherwise the process continues at step 420. At step 414, the processor 58 is notified of a match and the matching comparison signature, and the "appliance signature matching" process is exited and returns to step 216 of FIG. 2. At step 418, the next member of the locally downloaded canonical signature database is selected. The process returns to step 406. At step 420, a determination is made regarding whether all members of the locally downloaded canonical signature database have been examined. If true, the process continues at step 422, otherwise the process continues at step 418. At step 422, processor 58 is notified that there is no match between the input signature and all members in the locally downloaded canonical signature database. The "Appliance signature matching process" returns to step 218 of FIG. 2.

Referring now to FIG. 5, which is a more detailed flowchart of a method embodiment of a process for "enhancing existing canonical signatures" generally described at step 212 of FIG. 2.

At step 502, an appliance signature is input to the appliance signature creator algorithm residing as a software module in the form of computer code on processor 58. At step 504, the electronic components of the input appliance signature at the previous step is compared against the corresponding components in the matched canonical signature (see step 214 of FIG. 2). At step 506, the electronic components of the signature are generalized using the input components along with the past data used for generating the existing canonical signature, which is stored in database 56 or 116. At step 508, we determine if the user is trustworthy. If true, the process continues at step 510, otherwise the process continues at step 512. At step 510, the non-electronic signature components are generalized using the input components along with the past data retrieved from database 56 or 116. At step 512, the data in the canonical signature database is reorganized. After step 512, the "enhancing existing canonical signatures" routine is exited and returns to step 204 of FIG. 2. At step 514, a canonical appliance signature is identified as a match. At step 516, the user's history of responses is input to determination step 508.

Referring now to FIG. 6, which is a more detailed flowchart of a method embodiment of a process for "queryuser routine" generally described at step 218 of FIG. 2.

At step 602, the canonical appliance signature database is accessed. At step 604, it is determined whether the user's history is consistent with the data retrieved from the Canonical Signature Database 56 or 116 to determine whether the user is trustworthy. If it is determined that the user is trustworthy, the process continues at step 606, otherwise, the process continues at step 612. At step 606, the user is determined to be trustworthy. At step 608, the user is queried to determine which appliance generated the unknown waveforms. At step 610, the appliance is assigned an appliance identity by the user and the process terminates. At step 612, the user's history of responses is retrieved to determine whether the user's history is consistent with data in the canonical database at step 604.

Referring now to FIG. 7, which is a more detailed flowchart of a method embodiment of a process for "creating a new canonical signature" generally described at step 224 of FIG. 2.

At step 702, collected appliance signatures are input to the appliance signature creator algorithm 65 residing as a software module in the form of computer code on processor 58. At step 704, it is determined whether the user is trustworthy. A user's history of responses is provided as input to this process at step 712. If it is determined that the user is trustworthy, the process continues at step 706, otherwise the process terminates. At step 706, the user is determined to be trustworthy. At step 708, we create a new canonical signature tagged with the user-given identity provided at step 714. An input to this process is a user provided identity for the appliance. At step 710, reorganize the data in the canonical signature database.

Appliance Table

Figure 13:
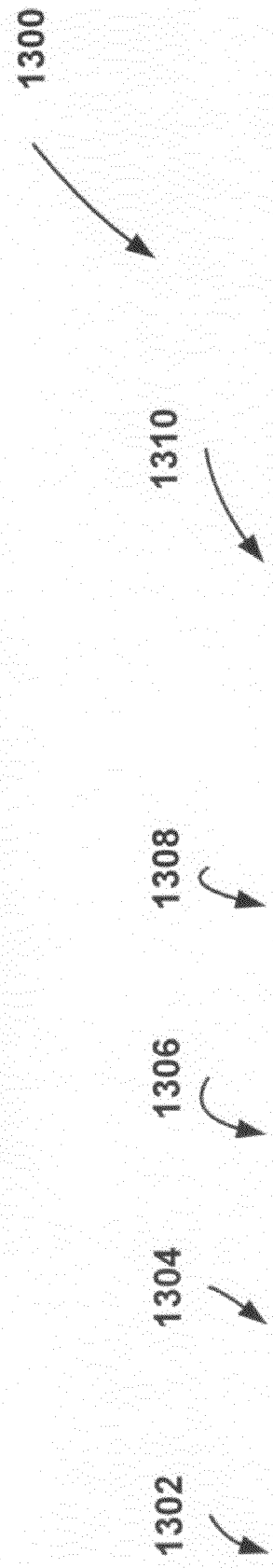
FIG. 13 is a field description of an Appliance Table 1300, according to one embodiment.

FIG. 13 is a field description of an Appliance Table 1300, according to one embodiment. The Appliance Table stores information by appliance name, which may primarily be by brand name (e.g., "Miele"). Fields of the Appliance Table include at least an Appliance Name field 1302 and a Brand name 1304. The Appliance Name field 1302 is the user-assigned name of an appliance whose signature is stored in a system database (116 or 56). In some embodiments, other identifying indicia, such as, for example, signature components (modes of operation 1306, paths 1308, and transitions 1310) may also be included. The user table on the client machine will have only a single row, or at most one row for each appliance type. Because of this, information may be stored in a data structure other than in a table.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

What is claimed is:

1. A method of remotely identifying at least one unknown appliance, the method comprising:
    a) independently metering waveform data transmitted from said at least one unknown appliance via at least one corresponding multi-port monitoring device over an elapsed time period;
    b) wirelessly transmitting the independently metered waveform data from said at least one corresponding multi-port monitoring device to a co-located system controller;
    c) constructing one or more appliance signatures at said co-located system controller for said at least one unknown appliance from the wirelessly transmitted waveform data; and
    d) processing the one or more constructed appliance signatures at the system controller to identify said at least one unknown appliance.

2. A method according to claim 1, wherein said multi-port monitoring device is electrically coupled to said at least one unknown appliance.

3. A method according to claim 1, wherein the independently metered waveform data comprises at least one characteristic of electrical energy consumed by said at least one unknown appliance.

4. A method according to claim 1, wherein said step (a) of independently metering waveform data of said at least one unknown appliance over an elapsed time period further comprises, collecting said independently metered waveform data over different time scales.

5. A method according to claim 4, wherein the different time scales comprise: collecting short-time waveforms from said at least one unknown appliance of less than substantially 1 second in duration; and collecting long-time waveforms from said at least one unknown appliance of greater than or equal to substantially 10 seconds in duration.

6. A method according to claim 1, wherein said step (c) of constructing one or more appliance signatures at said co-located system controller for said at least one unknown appliance from the wirelessly transmitted waveform data, further comprises:
    a) constructing one or more electronic signatures for said at least one unknown appliance;
    b) constructing one or more non-electronic signatures for said at least one unknown appliance; and
    c) combining said one or more electronic signatures with said one or more non-electronic signatures to create said one or more appliance signatures.

7. A method according to claim 6, wherein said step (b) of constructing said one or more non-electronic signatures for said at least one unknown appliance further comprises:
    receiving time-stamped time and location data of said at least one unknown appliance at said co-located processor;
    associating each of said one or more constructed electronic signatures of said appliance with the time-stamped time and location data to construct said one or more non-electronic signatures;
    associating each of said one or more constructed electronic signatures of said appliance with data inputted by the user, which may include demographic data and preferences related to appliances;
    associating each of said one or more constructed electronic signatures of said appliance with on-site user behavior, which may include the proximity of the user to a specific outlet monitoring device.

8. A method according to claim 6, wherein said step (a) of constructing one or more electronic signatures for said at least one unknown appliance comprises:
    a) identifying and characterizing one or more modes of operation of said at least one unknown appliance;
    b) characterizing each identified mode of operation according to one or more common waveform properties; and
    c) identifying and characterizing transitions between said one or more identified modes of operation;
    d) identifying and characterizing paths taken between the one or more identified modes of operation.

9. The method according to claim 8, wherein said step (a) of identifying and characterizing said one or more modes of operation further comprises: identifying regions of regularity in said waveform characterized time periods of regular variation.

10. The method according to claim 9, wherein said time periods of regular variation are identified in said waveform data using one or more of: a statistical analysis, a Fourier analysis, a time-series analysis, a wavelet analysis, a machine learning method, and a pattern recognition method.

11. The method according to claim 8, wherein the common waveform properties comprise one or more of: a voltage waveform property, a current waveform property, a power level waveform property, a power spectra waveform property, a characteristic rise or decay time constant waveform property, a noise level waveform property, and a normal mode waveform property.

12. The method according to claim 8, wherein said step (c) of identifying and characterizing transitions between said identified modes of operation comprises: identifying one or more waveform properties during said transition.

13. The method according to claim 12, wherein the one or more waveform properties comprise: (a) a starting and ending voltage/current, (b) a rise/fall time of the voltage/current, (c) oscillations at characteristic frequencies, (d) characteristic noise levels and (e) phase characteristics.

14. A method according to claim 8, wherein said step (d) of identifying and characterizing the paths taken between the said identified modes of operation comprises: recording an order and a sequence of modes of operation visited by said at least one unknown appliance over an extended time interval greater than 10 seconds in duration.

15. A method according to claim 1, wherein said step (e) of processing the one or more constructed appliance signatures at the central controller to identify said at least one unknown appliance, further comprises:
a) comparing the appliance signature to a database of pre-stored canonical signatures to determine if there is a match between said appliance signature and one of said pre-stored canonical signatures;
c) identifying said at least one unknown appliance based on a match between said appliance signature and one of said pre-stored canonical signatures; and
d) otherwise requesting that a user provide said at least one unknown appliance identity information in the case where there is no match.

16. A method according to claim 5, wherein the canonical signature is characterized by: (1) generalized modes of operation and transitions between said generalized modes of operation, (2) generalized paths between said generalized modes of operation, and (3) statistical analyses reflecting generalized non-electronic data.

17. A method according to claim 16, wherein said generalized modes of operation are formed by:
matching modes of operation identified in said input signatures to a canonical signature set of modes; and
forming a union of all modes of operation across all input signatures.

18. A method according to claim 17, wherein said union of all modes of operation across all input signatures is formed in accordance with a clustering method whereby said modes are grouped into clusters that are subsets of similar modes.

19. A method according to claim 18, wherein similar modes are measured by waveform properties associated with each mode of operation.

20. A method according to claim 16, wherein said generalized transitions are formed by:
matching transitions identified in said appliance signatures to a canonical signature set of transitions; and
forming a union of all transitions across all input signatures.

21. A method according to claim 20, wherein said union of all transitions across all input signatures is formed in accordance with a clustering method whereby said transitions are grouped into clusters that are subsets of similar transitions.

22. A method according to claim 21, wherein similar transitions are measured by waveform properties associated with each transition.

23. A method according to claim 16, wherein said generalized paths are formed by:
matching paths identified in said appliance signatures to a canonical signature
set of paths;
recording the probability of observing a particular type of path in said appliance signatures;
summarizing these probability in a compact symbolic construction, including
transition or adjacency matrices, network diagrams, and/or labeled graphs.

24. A method according to claim 16, further comprising storing the created canonical signature in said database of pre-stored canonical signatures.

25. An identification and detection system for detecting and identifying a plurality of unknown electrical devices, comprising:

(I) a local system controller (50), comprising:
a data uploading module (52) configured to send appliance signature data from the local system controller (50) to a system management node (102);
a data packaging module (54) operatively coupled to the data uploading module (52) and configured to compress appliance signature data for transmission over a network (60);
a database (56) configured to store a local copy of canonical signatures;
a processor (58) configured to construct canonical signatures and match appliance signature of unknown appliances against the stored local copy of canonical signatures;
a data receiving module (62) configured to wirelessly receive independently metered waveform data;
(II) a plurality of multi-port monitoring devices (12) configured to independently meter waveform data generated by a corresponding plurality of unknown appliances over an elapsed time period and wirelessly transmit the waveform data to the system controller (50);
(III) a system management node (102) configured to:
(a) receive the independently metered waveform data from the plurality of multi-port monitoring devices (12);
(b) process the independently received metered waveform data to identify the plurality of unknown appliances;
(IV) the management system node (102) comprising:
(i) a server (104) configured to buffer the independently metered waveform data received from the plurality of multi-port monitoring devices (12) and perform server load balancing;
(ii) a processor (114) configured to provide dedicated access to database 116;
(ii) a plurality of distributed computing nodes (112) configured to execute computational instructions pertaining to the management of canonical signatures and general appliance detection related tasks;
(iv) a cluster front end (106) configured to load distribute, load balance, and manage the distributed computing nodes (112); and
(v) a transient database (110) for storing short- to mid-term data related to appliance detection.

26. A system according to claim 25, wherein the system controller (50) further comprises an archive database (116) for storing canonical signatures of appliances.

27. A system according to claim 25, further including program instructions executable on processor (58) for managing wireless communication between the plurality of multi-port monitoring devices (12) and the system controller (50).

28. A system according to claim 25, further including program instructions for constructing appliance signatures from wirelessly received electronic and non-electronic data wirelessly received from the plurality of multi-port monitoring devices (12), whereby the program instructions are implemented as software running on processor (58).

29. A system according to claim 25, further including program instructions for matching appliance signatures against a database of appliance signatures, whereby the program instructions are implemented as software running on processor (58).

30. A system according to claim 25, further including program instructions for validating user responses provided to the system controller (50), whereby the program instructions are implemented as software running on processor (58).

* * * * *